United States Patent
Upton et al.

(10) Patent No.: US 12,480,106 B2
(45) Date of Patent: Nov. 25, 2025

(54) REACTIONS WITH NON-RETROVIRAL REVERSE TRANSCRIPTASE

(71) Applicant: The Regents of the University of California, Oakland, CA (US)

(72) Inventors: Heather E. Upton, Berkeley, CA (US); Lucas Ferguson, Berkeley, CA (US); Sidney Pimentel, Berkeley, CA (US); Kathleen Collins, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 384 days.

(21) Appl. No.: 18/295,268

(22) Filed: Apr. 4, 2023

(65) Prior Publication Data

US 2023/0235302 A1    Jul. 27, 2023

Related U.S. Application Data

(63) Continuation of application No. PCT/US2021/054072, filed on Oct. 8, 2021.

(60) Provisional application No. 63/090,116, filed on Oct. 9, 2020.

(51) Int. Cl.
*C12N 9/12* (2006.01)
*C12N 15/10* (2006.01)
*C12Q 1/6848* (2018.01)

(52) U.S. Cl.
CPC ....... *C12N 9/1276* (2013.01); *C12N 15/1096* (2013.01); *C12Q 1/6848* (2013.01); *C12Y 207/07049* (2013.01); *C12N 2310/321* (2013.01); *C12Q 2600/16* (2013.01)

(58) Field of Classification Search
None
See application file for complete search history.

(56) References Cited

U.S. PATENT DOCUMENTS

2014/0113332 A1* 4/2014 Betts ................ C12P 19/34
536/23.1

FOREIGN PATENT DOCUMENTS

WO    2020033777    2/2020

OTHER PUBLICATIONS

International Search Report for priority PCT/US21/54072, 15 pages (Mar. 17, 2022).

(Continued)

*Primary Examiner* — Erin M. Bowers
(74) *Attorney, Agent, or Firm* — Richard Aron Osman

(57) ABSTRACT

Improved compositions and methods for using modified non-retroviral reverse transcriptase to perform 3' extension of a nucleic acid, employ non-templated deoxynucleotide addition to a single-stranded nucleic acid and/or synthesis of complementary DNA using non-complementary nucleic acids as primer and template (RNA- or DNA-templated DNA polymerase activity).

24 Claims, 11 Drawing Sheets

(56) References Cited

OTHER PUBLICATIONS (Choi, JH., et al.). "Kinetic Analysis of Base Pairing Preference for Nucleotide Incorporation Opposite Template Pyrimidines by Human DNA Polymerase [iota]" pp. 264-274. Journal of Molecular Biology. vol. 389, No. 2. Jun. 5, 2009; p. 3, 2nd paragraph; DOI 10.1016/j.jmb.2009.04.023.

Extended European Search Report for related EP 21878579.8, 23 pages (Jun. 11, 2024).

Upton Heather E. et al: "Low-bias ncRNA libraries using ordered two-template relay: Serial template jumping by a modified retroelement reverse transcriptase", Proceedings of the National Academy of Sciences, vol. 118, No. 42, Oct. 14, 2021 (Oct. 14, 2021).

\* cited by examiner

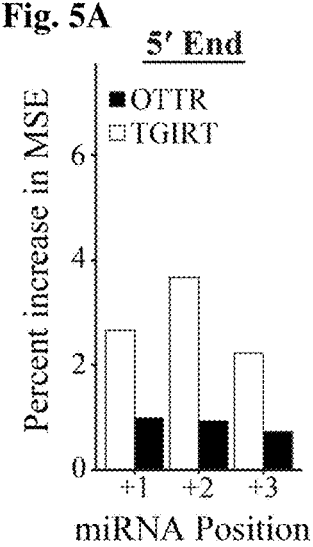
Fig. 5A
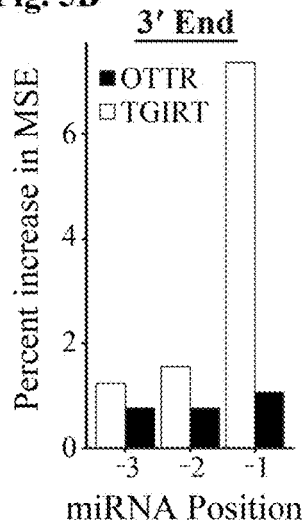
Fig. 5B
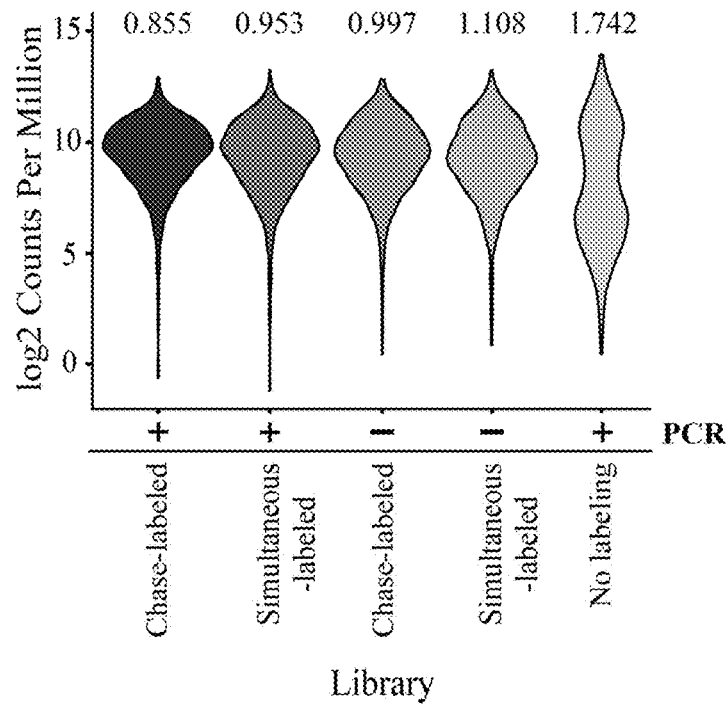
Fig. 6
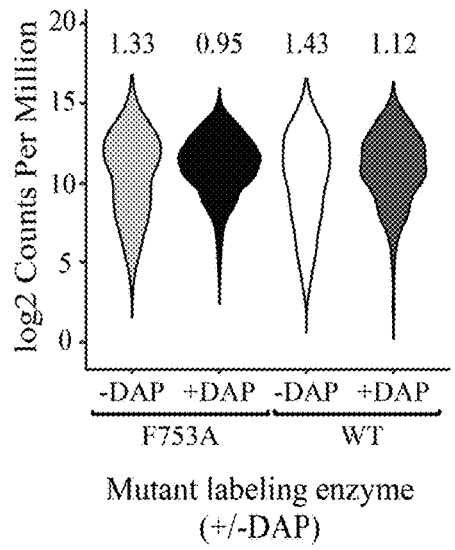
Fig. 7
Fig. 8
| Sequencing trial | I | II | III |
|---|---|---|---|
| 3' Adaptor Template w/ 5' Cy5 | N | Y | Y |
| DNA Primer w/ 5' Cy5 | N | Y | Y |
| Primer-complement RNA Oligo w/ 2' O-Me | N | N | Y |
| 3' Adaptor Template Reads | 3.089% | 0.135% | 0.115% |
| TPRT DNA Primer Reads | 0.226% | 0.032% | 0.029% |
| TPRT RNA Passenger Reads | 0.61% | 0.52% | 0.005% |

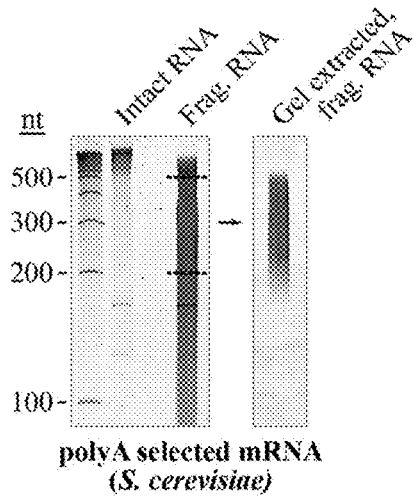 Fig. 20A polyA selected mRNA (*S. cerevisiae*)
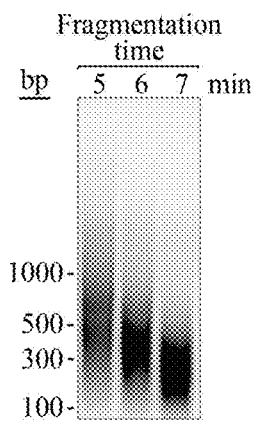 Fig. 20B 293T genomic DNA
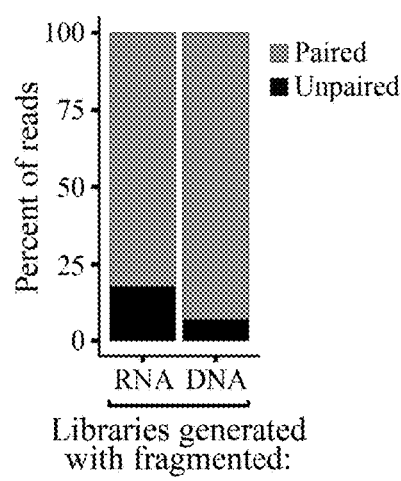 Fig. 20C Libraries generated with fragmented:
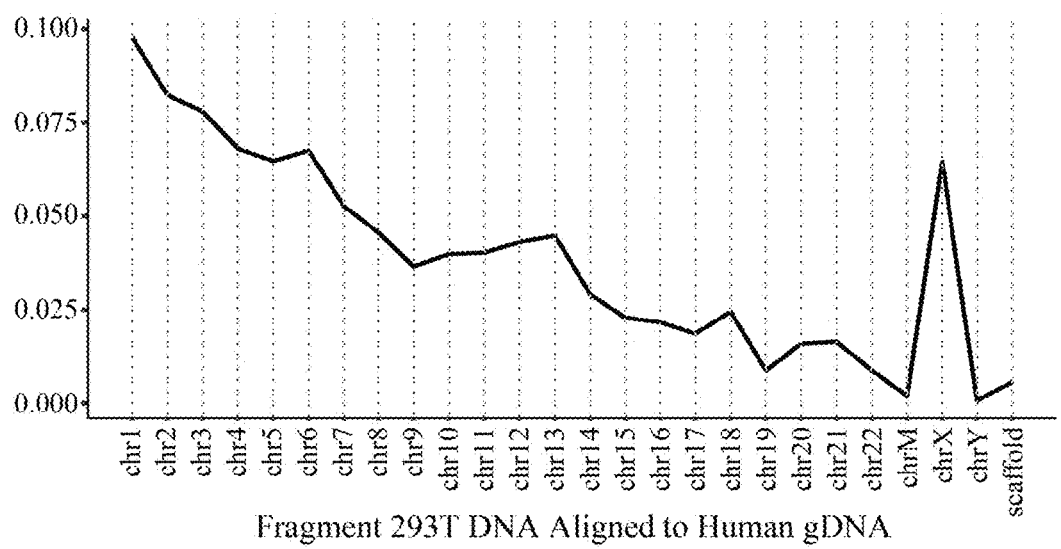 Fig. 21 Fragment 293T DNA Aligned to Human gDNA

REACTIONS WITH NON-RETROVIRAL REVERSE TRANSCRIPTASE

BACKGROUND OF THE INVENTION

Information about a mixed-species biome, single organism, tissue, cell, body fluid, biopsy, or other clinical or research sample can be gained by interrogating the sequences of DNA or RNA in the sample. This molecular read-out is currently used for some research and clinical applications and has promise to become a mainstay of affordable personalized medicine. An RNA survey can be more information-rich than a DNA survey due to the distillation of information by sampling only the expressed genome. However, although RNA sequencing has great promise for identification and discrimination of biological states, techniques for RNA sequencing (RNA-seq) are limited by the initial requirement of RNA copying to complementary DNA (cDNA) prior to library production for any high-accuracy sequencing platform.

Production of cDNA from RNA templates is typically performed by adding a DNA primer that base-pairs with the template and recruits a reverse transcriptase (RT) to initiate at the site of prior primer-template base-pairing. RTs in widespread use have been modified from retrovirus-encoded enzymes, which evolved to require a substantially base-paired primer-template. DNA synthesis from the primer 3' end will occur 5'-3' by copying 3'-5' on the template, so information at the template 3' end is not possible to copy when substantial primer-template base-pairing is required. This evolutionarily selected dependence of retroviral cDNA synthesis limits the production of cDNA to be from only RNA templates that have a known or inferred sequence used to design a complementary primer, and only from the portion of RNA template 5' to the primer-complementary sequence. Limited tolerance for RNA secondary structure or RNA modification, among other possible template features, also exacerbates information loss.

Retroviral RTs can template-switch. In cells this occurs by degradation of the RNA template base-paired to cDNA, followed by cDNA annealing to the same or a different, sequence-complementary position on another molecule of template. In vitro, enzymes derived from a retroviral RT can, at relatively low efficiency, make a 3' overhang from cDNA duplex that is described as biased towards polycytidine synthesis. This several-nt 3' overhang can base-pair with a "template switch oligonucleotide" containing tandem guanosines at its 3' end to template the continued synthesis of cDNA (Reverse transcriptase template switching: A smart approach for full-length cDNA library construction. Zhu, Y. Y., Machleder, E. M., Chenchik, A., Li, R., and Siebert, P. D. 2001. BioTechniques 30, 892-897; US20160304946). In other words, the RT "jumps off" the input template to an adaptor template (FIG. 2). Of particular note, because this method adds an adaptor to only the 3' side of the cDNA, the cDNA 5' adaptor must be added by a separate process (e.g. by polyadenylation or ligation of input RNA) to generate a library useful for sequencing.

To develop new RT applications, a non-retroviral type of RT could prove useful. Two different types of non-retroviral RT have been used for cDNA library synthesis in limited prior art: an intron-encoded prokaryotic RT (iRT) and a eukaryotic non-long-terminal repeat (non-LTR) retroelement RT (eRT). These two types of protein have substantially different protein domain structure and different active site motif additions (FIG. 1).

First, thermostable bacterial iRT can be used to initiate cDNA synthesis from a primer duplex with no 3' overhang or with a single-nucleotide (nt) overhang that is a mixture of all 4 standard dNTPs (N=mixed A, C, G, T). The primer will initiate synthesis on a physically separate RNA template 3' end (Identification of protein-protected mRNA fragments and structured excised intron RNAs in human plasma by TGIRT-seq peak calling. Yao J, Wu D C, Nottingham R M, Lambowitz A M. eLife. 2020 Sep. 2; 9:e60743, and references cited therein; US20180346890). The utility of the iRT is that it can "jump on" the input template from an adaptor primer to append the cDNA 5' adaptor (FIG. 2).

In nature iRTs do not prime synthesis on physically separate RNA templates, and as a natural consequence, properties of the iRT limit the utility of this reaction. For example, iRT has very strong bias against using templates with the lengths typical of many processed cellular RNAs such as microRNAs (miRNA) and transfer RNA (tRNA) fragments (tRFs), and it has different efficiency of template use depending on input RNA 3' and 5' sequence (Improved TGIRT-seq methods for comprehensive transcriptome profiling with decreased adaptor dimer formation and bias correction. Xu H, Yao J, Wu D C, Lambowitz A M. Sci Rep. 2019 May 28; 9(1):7953; Upton et al. PNAS 2021 in press). Bias arises in part from +1N primer base-pairing to templates, which inherently favors use of templates with a 3' G or C due to greater hydrogen bonding of G-C relative to A-T or A-U. Furthermore, the thermostable iRT cDNA synthesis reaction must be performed at a high temperature that accelerates input RNA self-cleavage. Also, because this method does not add an adaptor handle to the cDNA 3' side during cDNA synthesis, additional steps of cDNA product ligation and clean-up are required to generate a library useful for sequencing. The use of "jump on" initiation without "jump off" results in an inability to distinguish whether a cDNA library sequence of an RNA fragment was actually from an RNA fragment in the input sample or is an artifact of incomplete reverse transcription of a full-length RNA (Broad role for YBX1 in defining the small noncoding RNA composition of exosomes. Shurtleff M J, Yao J, Qin Y, Nottingham R M, Temoche-Diaz M M, Schekman R, Lambowitz A M. Proc Natl Acad Sci USA. 2017 Oct. 24; 114(43):E8987-E8995). For these and other reasons evident to those skilled in the art, this method is not suitable for obligately end-to-end capture of small RNAs into a cDNA library.

Second, the ability of eukaryotic retroelement RT (eRT) from the non-long-terminal-repeat (non-LTR) R2 retroelement of *Bombyx mori* to "jump off" a cDNA was used to append a 3' cDNA adaptor (WO2018089860). This "jump off" activity of *B. mori* R2 RT has been described in peer-reviewed prior art (End-to-end template jumping by the reverse transcriptase encoded by the R2 retrotransposon. Bibillo A, Eickbush T H. J Biol Chem. 2004 Apr. 9; 279(15):14945-53; The reverse transcriptase of the R2 non-LTR retrotransposon: continuous synthesis of cDNA on non-continuous RNA templates. Bibillo A, Eickbush T H. J Mol Biol. 2002 Feb. 22; 316(3):459-73).

We have developed a truncated, modified *Bombyx mori* R2 non-LTR retroelement RT, hereafter indicated as BoMoC, to perform Ordered Two-Template Relay (OTTR). OTTR combines "jump on" and "jump off" at high efficiency in the same cDNA synthesis reaction, and furthermore OTTR does so with a desired order of template use (FIG. 2). *B. mori* R2 RT is reportedly not able to "jump on" (The reverse transcriptase of the R2 non-LTR retrotransposon: continuous synthesis of cDNA on non-continuous RNA templates. Bibillo A, Eickbush T H. J Mol Biol. 2002 Feb. 22; 316(3):459-73), and iRTs are inefficient for "jump off" even under highly optimized conditions (Template-switching mechanism of a group II intron-encoded reverse transcriptase and its implications for biological function and RNA-Seq. Lentzsch A M, Yao J, Russell R, Lambowitz A M. J Biol Chem. 2019 Dec. 20; 294(51):19764-19784). OTTR not only combines efficient "jump on" and "jump off" but also does so copying different templates in the intended order.

OTTR is the only cDNA library production method that allows RT synthesis of a cDNA library with both 5' and 3' adaptor handles from a pool of input RNA of unknown sequence (FIGS. 3A-3B). Performing both adaptor fusions in the same reaction reduces sample loss that would otherwise occur from nucleic acid transfers, precipitation, or binding to and elution from a surface such as a spin column or other purification matrix. The single reaction also reduces irreproducibility in sample handling imposed by 2 separate steps of adaptor addition. Another advantage of the OTTR method is that ensures end-to-end capture of RNAs into cDNA, avoiding mistaken conclusions about the presence of RNA fragments when the input RNA was in fact full-length. Also, the method provides less sequence bias of template use than any commercial method, including methods using "jump on" or "jump off" only (FIG. 4; Upton et al PNAS 2021 in press).

Here we describe enzyme and reaction improvements to OTTR and for more general polymerase and nucleic acid labeling applications, and uses beyond cDNA library synthesis.

SUMMARY OF THE INVENTION

The invention provides improved compounds, compositions, enzymes, proteins, assays, systems, applications and methods for using modified non-retroviral reverse transcriptase to perform 3' extension of a nucleic acid, including non-templated nucleotide addition to the DNA strand of a nucleic acid duplex (NTA), non-templated nucleotide addition to a single-stranded nucleic acid (terminal transferase activity, TT), templated synthesis of cDNA on a primed template (fill-in synthesis, primer extension), and/or cDNA synthesis across physically separate nucleic acid templates (template jumping).

Nucleic acid reactions using modified non-retroviral reverse transcriptase were improved by non-obvious changes to buffer conditions, reaction components, adaptor oligonucleotide composition, and enzyme sequence. These improvements benefit other uses of BoMoC and eRT enzymes in general, including but not limited to uses that benefit from an optimal or specifically tuned amount of one or more activities above, or changes in one activity without changes in another activity, or processivity, turnover, strand displacement, template preference, or other feature of activity. These improvements have utility for applications of the technologies of WO2020033777, for other methods of cDNA synthesis, for other RNA-templated or DNA-templated polymerase reactions, and for untemplated nucleotide or modified nucleotide addition among broader applications.

In an aspect the invention provides a method of using a non-retroviral reverse transcriptase to perform 3' extension of a nucleic acid by OTTR, the method comprising: use in the reaction of a non-canonical nucleotide suppresses excessive non-templated cDNA 3' extension in RT reaction conditions without inhibiting templated DNA synthesis, wherein the use improves reaction yield or suppression of unwanted products in the reaction.

In embodiments: the non-canonical nucleotide is 2,6 diaminopurine 2' deoxyribose triphosphate (dDAP-TP), replacing most of the adenosine deoxyribose triphosphate (dATP).

In an aspect the invention provides a method of using a non-retroviral reverse transcriptase to perform 3' extension of a nucleic acid in an OTTR reaction, the method comprising: use in the reaction of a modified passenger strand of the primer duplex, wherein the use improves reaction yield or suppression of unwanted products in the reaction.

In embodiments:
the modification comprises 2' OMethyl groups in the 3' end of the passenger strand of the primer duplex; or
the primer duplex comprises a chimeric strand with approximately 10 nt of RNA at the 5' end, and the remainder of nucleotides with 2'OMethyl group substitution.

In an aspect the invention provides a method of using a non-retroviral reverse transcriptase to perform 3' extension of a nucleic acid in an OTTR reaction, the method comprising: use in the reaction of sequential terminal transferase (TT) labeling of input templates with adenosine dideoxyribose triphosphate (ddATP) then guanosine dideoxyribose triphosphate (ddGTP), wherein the use improves reaction yield or suppression of unwanted products in the reaction.

In embodiments:
the method comprises use of a first TT step of template 3' extension with a purine (Pu or R) nucleotide or nucleotide analog using eRT in Mn reaction buffer, for template selection by primer harboring 3'+1 pyrimidine (Py or Y) nucleotide or nucleotide analog overhang from the primer duplex, wherein to 3'-extend the template pool to near completion using eRT TT activity while retaining maximal library yield relative to unwanted side-products, the TT labeling reaction proceeds by initial labeling with an adenosine deoxynucleotide triphosphate derivative (for example ddATP) followed later in reaction time by supplementation with a guanosine deoxynucleotide triphosphate derivative (for example ddGTP).

In an aspect the invention provides a method of using a non-retroviral reverse transcriptase to perform 3' extension of a nucleic acid in an OTTR reaction, the method comprising: suppressing unwanted products by termination of template copying using a Cy5 5' extension of the 3' acceptor template(s), primer strand(s), and/or other oligonucleotides present except those of the input template pool, wherein the use improves reaction yield or suppression of unwanted products in the reaction.

In an aspect the invention provides a modified non-retroviral reverse transcriptase to perform 3' extension of a nucleic acid in an OTTR reaction, comprising a sequence modification relative to the retroelement reverse transcriptase of *Bombyx mori* R2; see, WO2020033777 selected from:
a) a sequence change that increases eRT activity in cDNA synthesis reactions, exemplified by W403A, G415A, D500A, L704A, F708A, F753A, F753G, and I770A variants and combinations thereof;
b) a sequence change that increases eRT activity in TT reactions, exemplified by W403A, G415A, F753A, F753G, and I770A variants and combinations thereof;

c) a sequence change that decreases TT activity without severe reduction of templated cDNA synthesis, exemplified for example by D500A, F534G, L704A and F708A variants;
d) a sequence change that increases the parity of representation of input template sequences in cDNA libraries, exemplified by F753A variant;
e) a sequence change that reduces ability to add non-templated nucleotides to a cDNA product 3' end, useful for OTTR and other applications in which excessive NTA is detrimental, exemplified by K452A, R463A, D500A, G501A, F534G, L704A, and F708A variants; and
f) a sequence change that retains primed cDNA synthesis activity (fill-in synthesis) but reduces ability to use non-contiguous templates and to initiate cDNA synthesis by "jumping on" to a template from a primer duplex with blunt or +1Y overhang of the primer strand, useful for applications in which non-contiguous template copying would be detrimental, exemplified by R463A, R473A, D500A, G501A, F534G, L704A, and F708A variants.
g) a sequence change as described in (f) that is rescued for "jumping on" to a template from a primer duplex if the primer has a 3' overhang of +2 or +3 nt, useful for increasing the selectivity of cDNA synthesis on input molecules depending on their 3' end sequence, exemplified by R463A, R473A, D500A, F534G, and L704A variants.

Methods, compositions, improvements, assays and systems, as disclosed herein including: proteins added to the activity reactions, like TmCspB, or proteins used for RNA-DNA duplex purification from the reactions, like ZFa.

In an aspect the invention provides a method of using a disclosed non-retroviral reverse transcriptase, comprising: performing with the reverse transcript 3' extension of a nucleic acid in an OTTR reaction.

The invention encompasses all combinations of the particular embodiments recited herein, as if each combination had been laboriously recited.

BRIEF DESCRIPTION OF THE DRAWINGS

FIGS. 5A-5B. Comparison of OTTR to TGIRT cDNA libraries for bias. 5A shows bias arising from the most 5' three input template nucleotides (5' end is +1). 5B shows bias arising from the most 3' three template nucleotides (3' end is –1). Higher percentage increase in mean squared error (MSE) indicates higher bias arising different nucleotide sequence at each position.

FIG. 6. Two-stage input RNA 3' end labeling by BoMoC TT activity improves cDNA library CV. Numbers at top are CV cross-compared by analyses using the same number of reads, which was done for all cross-comparisons. "Chase-labeled" indicates ddA labeling followed by ddG labeling. "No labeling" indicates no input 3' end ddNTP labeling prior to reverse transcription. Chase-labeled improves CV relative to labeling with ddATP and ddGTP added simultaneously in both the no-PCR and the low-cycle PCR OTTR workflows.

FIG. 7. Non-native nucleotides improve complete cDNA synthesis. cDNA libraries were made using the OTTR workflows with only canonical deoxynucleotides or replacing some of the dATP with dDAP-TP in the cDNA synthesis reaction (– or +DAP respectively). Libraries were made using either BoMoC WT or mutant BoMoC F753A in the TT labeling step, followed by using BoMoC WT for the cDNA synthesis step. Using dDAP-TP improves cDNA library CV.

FIG. 8. Adaptor oligonucleotide design reduces the percentage of library sequences that are unwanted products. Results from analysis of sequencing reads for % unwanted product of several types: copying of adaptor template twice ("3' adaptor template reads") instead of input RNA template and adaptor template, copying of DNA primer instead of input RNA template ("DNA primer reads"), or copying of passenger (non-primer) strand of primer duplex instead of input RNA template ("RNA Passenger Reads"). Lower % unwanted reads are observed with 5' Cy5 on primer and 3' adaptor template, and also with the passenger strand of primer duplex with 2' O methyl modification.

FIGS. 20A-20C. OTTR cDNA libraries from fragmented mRNA and genomic DNA. 20A shows denaturing PAGE and direct staining of partially purified polyadenylated-tail mRNA, the same RNA chemically fragmented (Frag RNA), and the fragmented RNA after size-selection by slice excision from a denaturing PAGE gel (Gel extracted frag RNA). 20B shows denaturing PAGE and direct staining of sonicated HEK 293T cell genomic DNA. 20C shows OTTR cDNA library paired-end read analysis for size-selected RNA and sonicated DNA from the 6 min time point, were treated with phosphatase then used for cDNA library synthesis by OTTR. Most cDNAs showed concordance of paired-end read sequences (i.e. both of the paired-end sequences mapped to the same locus).

FIG. 21. Mapping of the fragmented DNA library reads to human chromosomes. On the X axis, human chromosomes are numbered roughly in order from largest to smallest, except that the X chromosome is not in rank order. Scaffolds are genome sequences not assigned to a chromosome. The Y axis shows number of mapped reads, which was proportional to expectation for distribution across the chromosomes.

DESCRIPTION OF PARTICULAR EMBODIMENTS OF THE INVENTION

Figure 1:
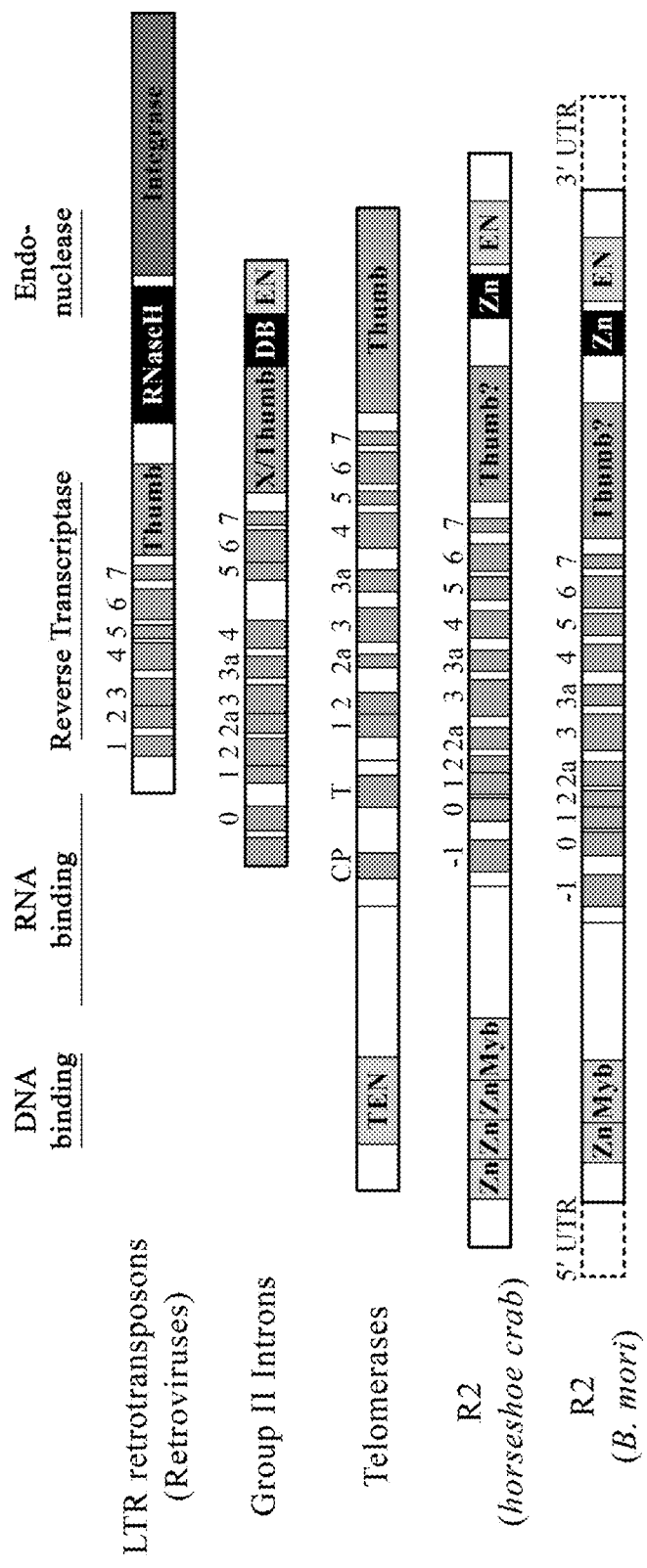
FIG. 1. Schematic of reverse transcriptase protein domain and active site motif architectures. R2 is a eukaryotic non-LTR retrotransposon from the ancestral single-ORF category; R2 proteins from different species and/or different lineages within a species' genome can have different domain architecture; see, Integration, Regulation, and Long-Term Stability of R2 Retrotransposons. Eickbush T H, Eickbush D G. Microbiol Spectr. 2015 April; 3(2): MDNA3-0011-2014.
Figure 2:
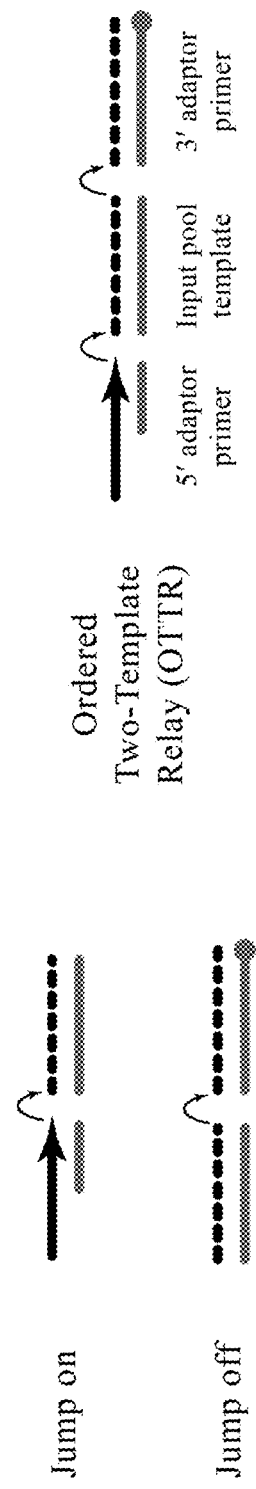
FIG. 2. Schematic of different types of template jumping used in cDNA library production. A mobile intron RT has been used to "jump on," a retroviral RT has been used to "jump off," and OTTR uses BoMoC to do both in ordered series in a single reaction.

Unless contraindicated or noted otherwise, in these descriptions and throughout this specification, the terms "a" and "an" mean one or more, the term "or" means and/or. The examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

A. Improved OTTR Reaction Yield, Reduced Bias of Template Copying, and Suppression of Unwanted Products were by Changes to the Workflow and Reaction Components.

1. OTTR library quality was improved by sequential TT labeling of input templates with ddATP then ddGTP.

OTTR reactions to capture the complexity of a nucleic acid pool of unknown sequence use a first TT step of template 3' extension with a purine (Pu or R) nucleotide or nucleotide analog using BoMoC in Mn reaction buffer. This 3' extension is required for template selection by primer harboring 3'+1 pyrimidine (Py or Y) nucleotide or nucleotide analog overhang from the primer duplex and enables ordered cDNA synthesis by copying one input template molecule and then the 3' adaptor template, which requires disfavoring use of 3' adaptor template as the first template copied. To 3'-extend the template pool to near completion using BoMoC TT activity while retaining maximal library yield relative to unwanted side-products, the TT labeling reaction proceeds by initial labeling with an adenosine deoxynucleotide triphosphate derivative (for example ddATP) followed later in reaction time by supplementation with a guanosine deoxynucleotide triphosphate derivative (for example ddGTP). This increases the % of input molecules used as intended for cDNA synthesis compared to use of either ddRTP alone or mixing both of them for simultaneous labeling, resulting in an improvement of CV (FIG. 6).

2. Non-canonical nucleotides can be used to suppress excessive NTA to primer duplex or to intermediate-stage cDNA, which depletes functional primer duplex or reduces library yield, respectively.

OTTR relies on the intermediate cDNA duplexes gaining one non-templated guanosine nucleotide at their 3' end to recruit the 3' adaptor template with 3'C. Also the primer duplex needs not to gain a non-templated nucleotide to be effective in initiating cDNA synthesis and to suppress the presence of unintended cDNA sequences. Typically, 3-4 nucleotides are added by NTA to a duplexed cDNA 3' end. Our previous technology development discovered that a primer +1Y overhang was partially inhibitory for additional NTA. However, intermediate cDNA product still reduced conversion efficiency of input RNA to double-adaptor flanked cDNA. To limit primer and cDNA extension by NTA, it is effective to use the nucleotide variant dDAP-TP in the RT reaction. This nucleotide can replace adenosine deoxyribose triphosphate (dATP) in cDNA synthesis by DNA polymerases. With BoMoC, cDNA synthesis with dATP completely replaced by dDAP-TP was not robust. However, replacement of most of the dATP with dDAP-TP was both productive for cDNA synthesis and greatly stimulated conversion of intermediate cDNA to double-adaptor tagged cDNA (FIG. 7). Use of dDAP-TP improves OTTR library yield, through increased conversion efficiency, and also OTTR library quality as evaluated for bias by CV (FIG. 7).

3. OTTR library yields and unwanted product suppression were improved by changes to the passenger strand of the primer duplex.

Modification of the 3' end of the passenger strand of primer duplex with 2' OMethyl groups improves cDNA library generation by decreasing unwanted product synthesis (FIG. 8). Entire strand substitution is strongly inhibitory, as is substitution of nucleotides that approach within six basepairs of the passenger strand 5' end, but a chimeric strand with approximately 10 nt of RNA and the remainder of nucleotides with 2' OMethyl group substitution is stimulatory for cDNA library synthesis.

4. Unwanted products were reduced using a Cy5 5' extension of (a) the 3' adaptor template, to efficiently terminate adaptor template copying rather than allow two adaptor template molecules to be copied into a contiguous cDNA, and (b) the the DNA primer oligonucleotide, to inhibit a 3' adaptor template jump from unwanted cDNA made by BoMoC use of the intended primer as both primer and template (FIG. 8).

Figure 9A:
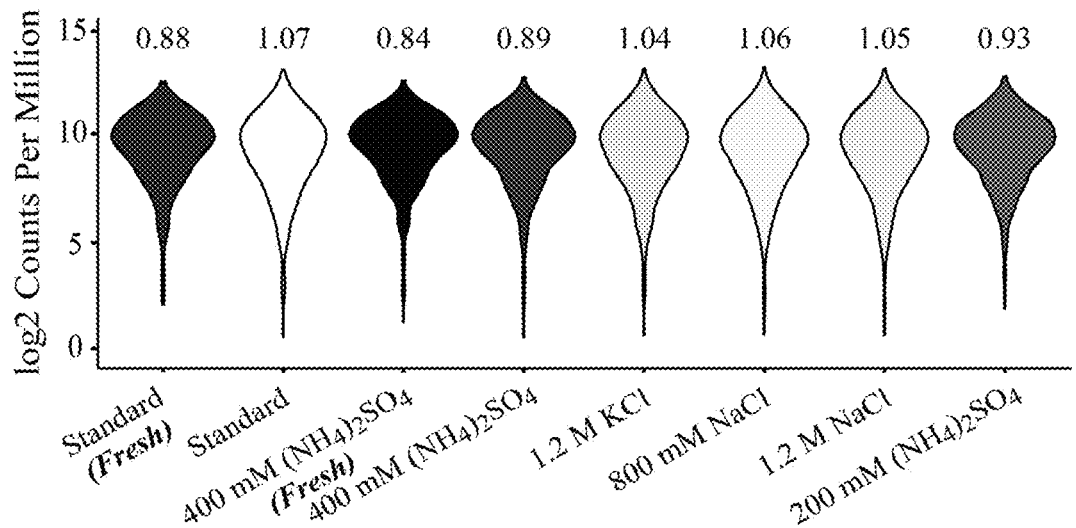
FIGS. 9A-9C. Changes in enzyme storage and reaction components improve cDNA library CV. All enzymes were assayed after 6 months of storage at –20° C. unless indicated as "fresh." 9A shows improvement in cDNA library CV by adding ammonium sulfate, especially if ammonium sulfate is added prior to storage (compare "400 mM $(NH_4)_2SO_3$" to "Standard"). 9B shows that reducing the pH of the storage buffer improves cDNA library CV. 9C shows that 0.5 M arginine added to storage buffer improves cDNA library CV.
Figure 9B:
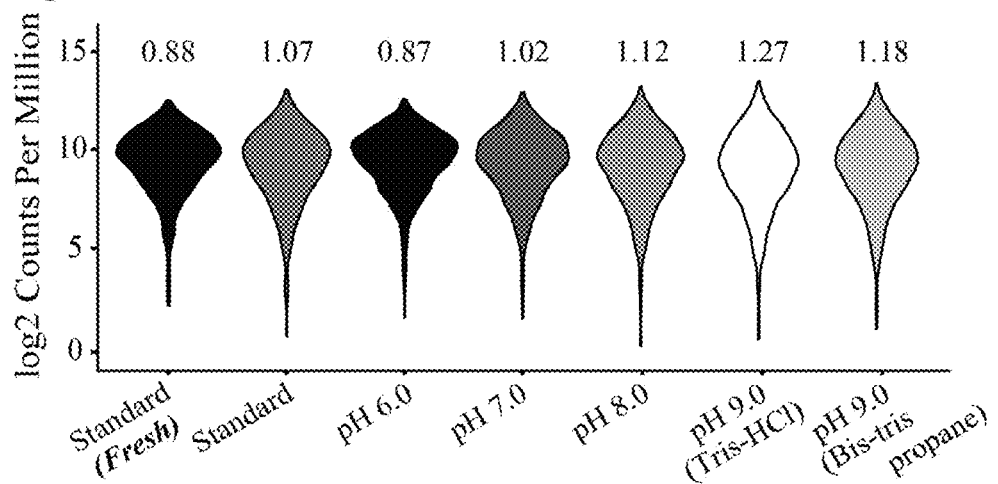
Figure 9C:
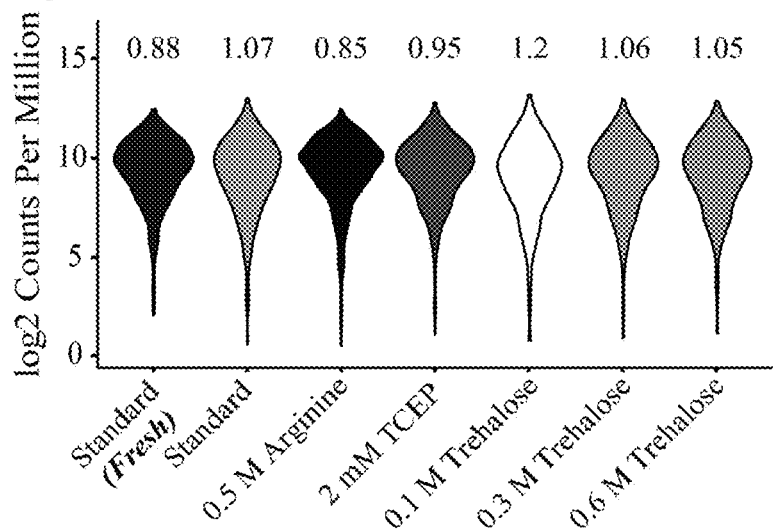
Figure 24A:
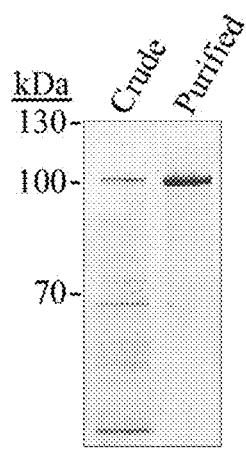
FIGS. 24A-24B. A method for purification of DNA-RNA duplexes longer than ~14 bp. 24A shows an SDS-PAGE gel of a truncated, tagged version of ZFa purified after bacterial expression. 24B shows a denaturing PAGE gel and direct staining of DNA-RNA duplex input (−lanes) and ZFa-bound duplex (+lanes) of 21, 15, 13, or 11 bp, or from at mixture of the 21 and 11 bp duplexes. Duplex of 13 bp is not bound, duplex of 15 bp is weakly bound, duplex of 21 is bound.
Figure 24B:
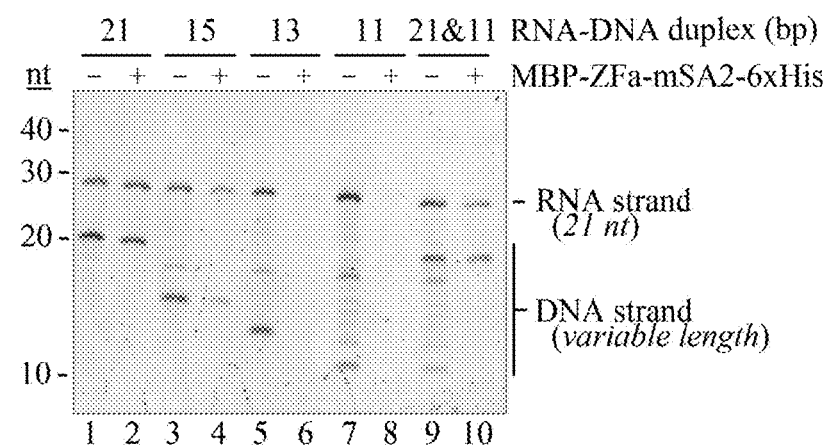

5. OTTR library quality was improved by changes to components of the reactions. Some components improve BoMoC storage stability and activity, for example ammonium sulfate [$(NH_4)_2SO_4$], pH 6.0, and 500 mM arginine (FIGS. 9A-9C). Some components improve input 3' labeling and/or cDNA synthesis reaction steps, for example addition of the recombinant protein TmCspB (FIGS. 24A-24B)

B. Enzyme Reactions were Improved by Changes to Enzyme Sequence.

1. Mutagenesis and sensitized assays discovered eRT sequence variants that improve its performance for specific or general applications; variants are defined relative to the retroelement reverse transcriptase of *Bombyx mori* R2; see, WO2020033777. Structure modeling and sequence alignments were used to select >100 amino acid substitutions to assay for desired changes in BoMoC properties. Of these slightly more than 10 (FIG. 10) had useful changes in BoMoC activities.

Figure 11A:
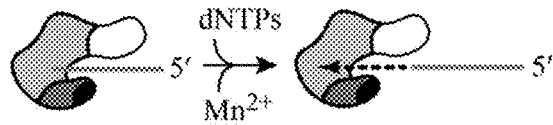
Figure 11B:
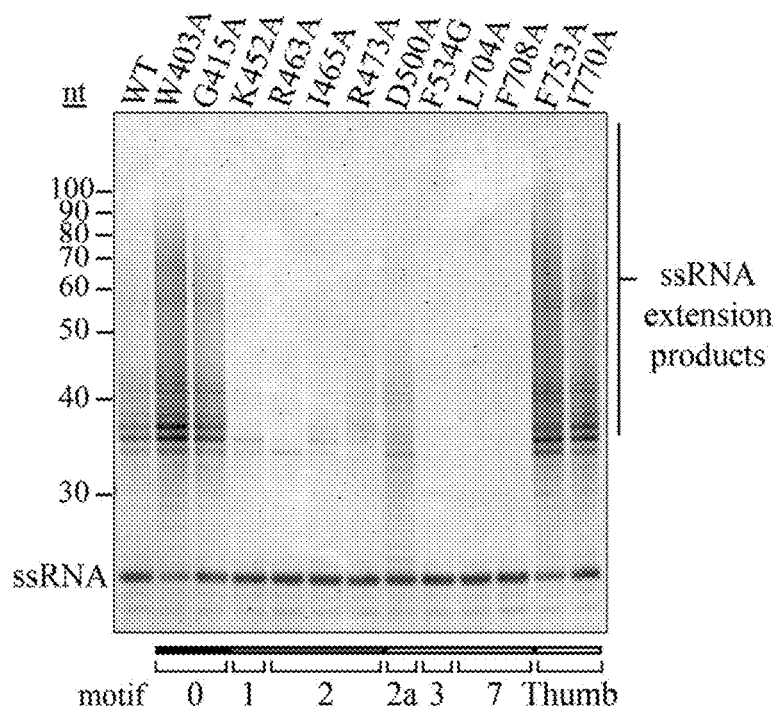

Sequence changes increase eRT activity in TT reactions. This change is exemplified by W403A, G415A, F753A, F753G, and I770A (FIGS. 11A-11B).

Sequence changes decrease eRT activity in TT reactions without severe reduction of RT activity in templated cDNA synthesis. This change is exemplified by D500A, F534G, L704A and F708A variants (compare FIGS. 11A-11B and 12A-12C).

Figure 12A:
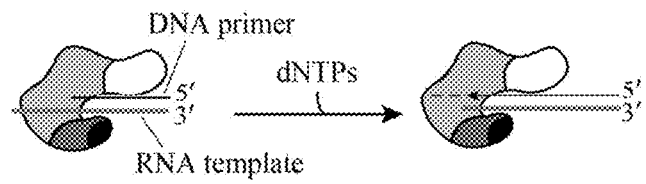
FIGS. 12A-12C. Improved cDNA synthesis activity from BoMoC amino acid substitutions. 12A shows a schematic of the assay used for fill-in cDNA synthesis on a base-paired primer and template. 12B shows the cDNA products of primer extension visualized by denaturing PAGE and direct staining. Eure and Eure SG are a group II intron RT. NTA is non-templated nucleotide addition, with length of added 3' overhang indicated at the side. WT and some BoMoC variants use the oligonucleotides of the excess annealed primer-template to continue cDNA synthesis by template jumping. 12C shows quantification of cDNA synthesis activity from experimental replicates normalized to WT.
Figure 12B:
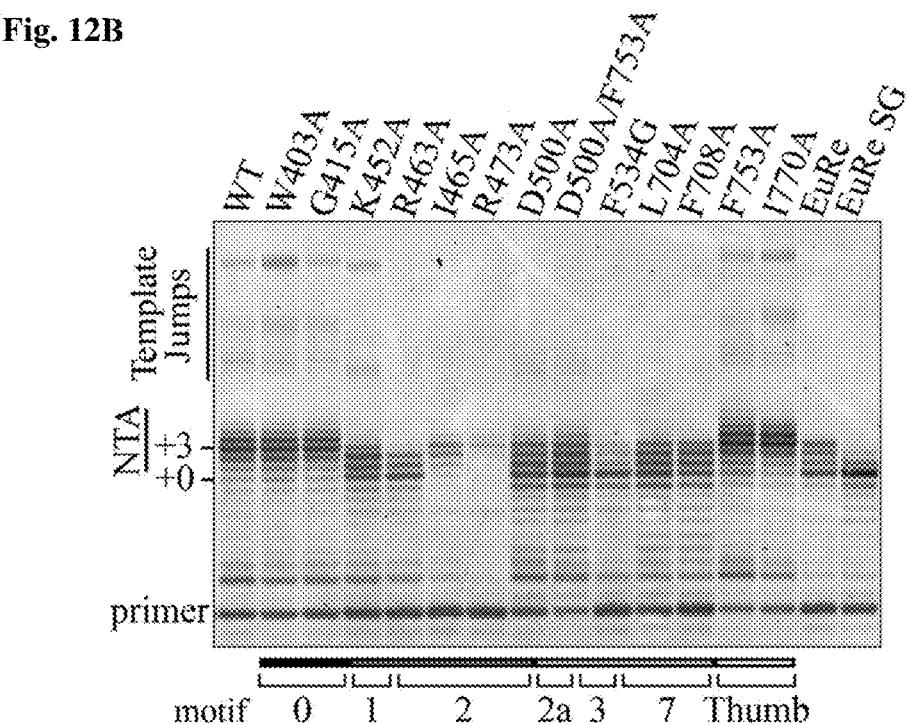
Figure 12C:
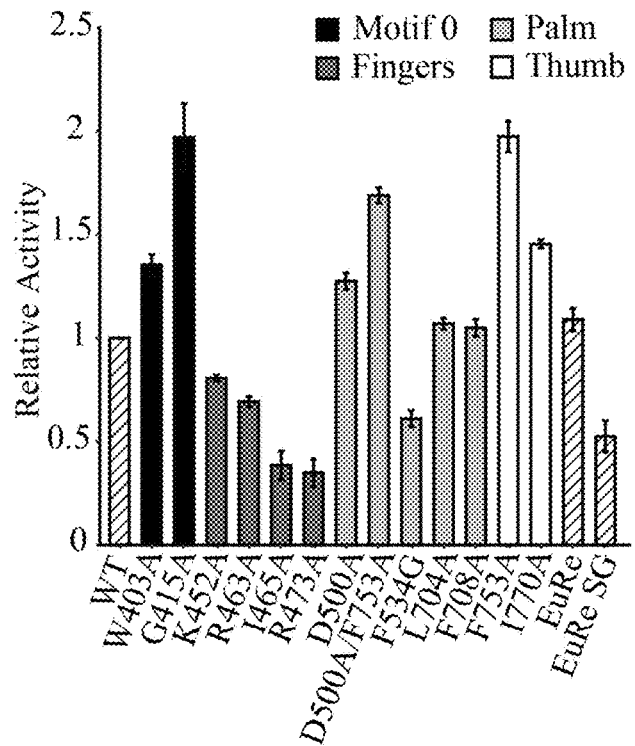

Sequence changes increase eRT activity in templated cDNA synthesis (RT activity). This change is exemplified by W403A, G415A, D500A, L704A, F708A, F753A, F753G, and I770A variants (FIGS. 12A-12C).

Sequence changes reduce ability to add non-templated nucleotides to a cDNA product 3' end, useful for OTTR and other applications in which excessive RT-reaction NTA is detrimental. This change is exemplified by K452A, R463A, D500A, G501A, F534G, L704A, and F708A variants.

Figure 13A:
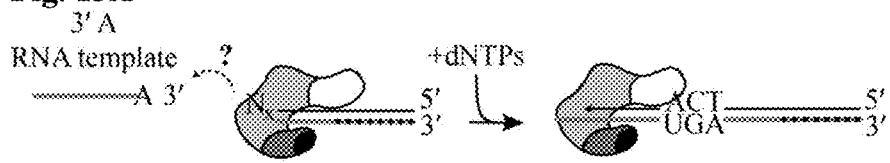
FIGS. 13A-13B. Distinct requirements for cDNA synthesis by template jumping. 13A shows a schematic of cDNA synthesis using primer duplex to initiate cDNA synthesis on a template RNA with 3' A. Primer duplexes had different 3' overhang lengths complementary to the template 3' end: 0, +1, +2, or +3. assay 13B shows products from reactions of BoMoC WT or the amino acid substitution variant indicated. "NEC" is no enzyme control and "No Temp" is no template control. Products were visualized by denaturing PAGE and direct staining. BoMoC WT greatly prefers a +1 overhang and under these reactions conditions also uses a +2 overhang. Some BoMoC variants such as F708A have high activity in the fill-in cDNA synthesis assay (FIGS. 12A-12C) but are only weakly or not detectably active for cDNA synthesis by template jumping (e.g. BoMoC F708A). Other BoMoC variants are inactive for template jumping from a blunt-end and/or +1 overhang primer duplex but have strong activity if the primer duplex has a +2 overhang (e.g. BoMoC R463A or D500A).
Figure 13B:
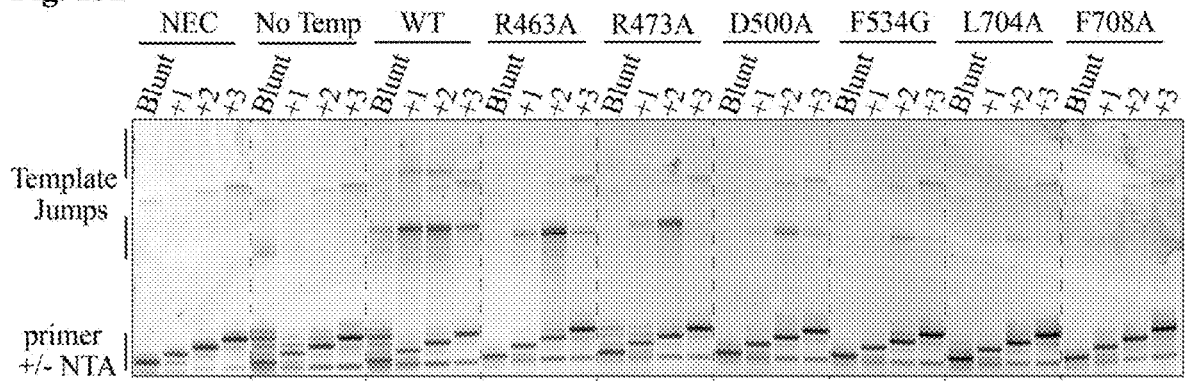

Sequence changes reduce ability to use non-contiguous templates without equivalent reduction of cDNA synthesis activity, useful for applications in which non-contiguous template copying would be detrimental. This change is exemplified by D500A, G501A, and F534G variants (FIGS. 13A-13B)

Sequence changes retains primed cDNA synthesis activity (fill-in synthesis) but reduce ability to use non-contiguous templates and to initiate cDNA synthesis by template jumping from a primer duplex with blunt or +1Y overhang of the primer strand, useful for applications in which non-contiguous template copying would be detrimental, exemplified by R463A, R473A, D500A, G501A, F534G, L704A, and F708A variants.

Sequence changes described immediately above rescued for template jumping if the primer has a +2 or +3 nt 3' overhang, useful for increasing the selectivity of cDNA synthesis on input molecules depending on their 3' end sequence, exemplified by R463A, R473A, D500A, F534G, and L704A variants Sequence changes increase the parity of representation of input template sequences in cDNA libraries. This change is exemplified by use of F753A BoMoC for the TT step of OTTR and BoMoC I770A for the cDNA synthesis step of OTTR (FIGS. 14A-14B and 15A-15B).

EXAMPLES

For Examples related to cDNA library sequencing, results described below were obtained using the Illumina platform. This is by way of example, not intended as a restriction to only the Illumina HTS platform; modifications evident to HTS users would adapt the technology for other platforms.

Also HTS results described below are using predominantly RNAs of <500 nt or DNA of >100 nt as input. This is by way of example, not intended as a restriction to a specific size range or particular type of nucleic acid or nucleic acid composite material.

Furthermore the technology has applications beyond HTS, for example to nanopore single-molecule sequencing, RT-PCR, nucleic acid labeling, and nucleic acid purification.

Example 1

Figure 3A:
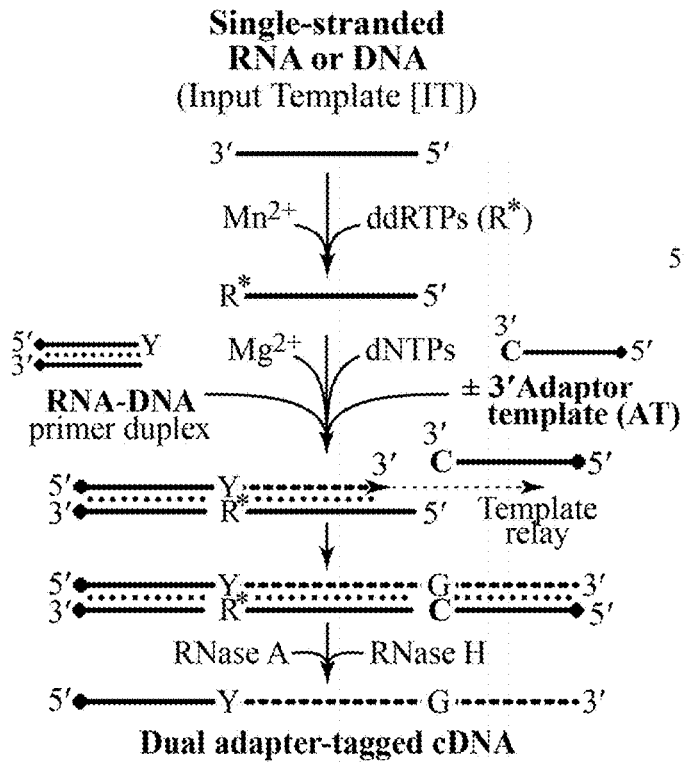
FIGS. 3A-3B. Strategy for single-tube cDNA library synthesis by OTTR. 3A illustrates the principles that enable ordered copying of two templates. 3B illustrates the use of OTTR and PCR to produce cDNA libraries for Illumina high throughput sequencing (HTS). OTTR reaction adaptors have sequences of Illumina R1 and R2 designed such that only cDNA product resulting from complete synthesis across an input molecule and the cDNA 3' adaptor template will bind to the sequencing flow cell.
Figure 3B:
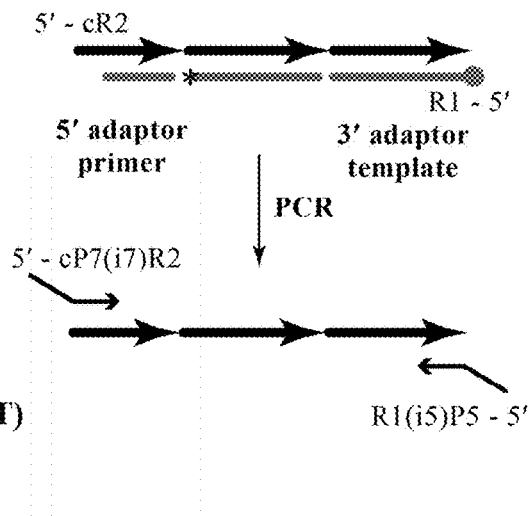

This example describes production of a cDNA library for Illumina HTS with single-tube cDNA library synthesis followed by PCR. In this example, an input RNA pool (e.g. the miRXplore pool of 962 different microRNAs purchased from Miltenyi Biotec) is used for OTTR to produce a cDNA library with flanking sequences complementary to the Illumina R1 and R2 adaptor regions that bind sequencing primers (FIGS. 3A-3B).

Input RNA was diluted into 20 mM Tris-HCl pH 7.5, 150 mM KCl, 0.5 mM DTT, 5% PEG-8000, 2 mM $MnCl_2$, 250 µM ddATP, and 0.7 µM BoMoC then incubated for 1.5 h at 30° C. Chase of 250 µM ddGTP was added and incubated for another 30 min at 30° C. The reaction was stopped by incubating at 65° C. for 5 min followed by addition of 5 mM $MgCl_2$ and 0.5 units of Shrimp Alkaline Phosphatase (rSAP, NEB M0371S). The phosphatase reaction was incubated at 37° C. for 15 min, stopped by addition of 5 mM EGTA, then incubated at 65° C. for 5 min. Subsequently, buffers were added to give an additional 0.5 mM $MgCl_2$ and 45 mM KCl plus 2% PEG-6000, 200 µM dGTP, 40 µM dTTP and dCTP, 2 µM dATP, 150 µM dDAP-TP, 90 nM RNA-DNA primer-duplex with +1T and +1C overhangs, 180 nM AT, and 0.5 µM BoMoC. Product cDNA was recovered and used for 4-8 cycles of PCR with Q5 high fidelity polymerase (NEB, M0491S). Quantification of libraries prior to sequencing used qPCR with primers specific to the Illumina P5 and P7 adaptor sequences and standards from the NEBNext Library Quant Kit (NEB, E7630S). Sequencing of prepared libraries was performed using an Illumina MiniSeq with the 75-cycle high-output kit.

In this Example, P545-R1 complement is fused at cDNA 3' end and P7-i7-R2 complement is fused at the cDNA 5' end. With this architecture, only cDNA with the 3' adaptor sequence included will bind to the flow cell. Swapping the adaptor positions to have a cDNA 3' end of P545-R1 and a 5' end of P7-i7-R2 gave highly similar cDNA library quality, which may be useful for other applications.

In this Example, primer complement strand contained 10 nt of RNA at its 5' end, remaining nucleotides of 2' OMethyl RNA, and a 3' non-extendable 3-carbon blocking group. For other uses, primer complement strands can be entirely RNA or composites of RNA, DNA, and non-standard nucleotides.

In this Example, the 3' adaptor template is mostly DNA but has 6 nt of RNA at its 3' end. For other uses, adaptor template molecules can have other inter-mixtures of DNA, RNA, and non-standard nucleotides.

Figure 16:
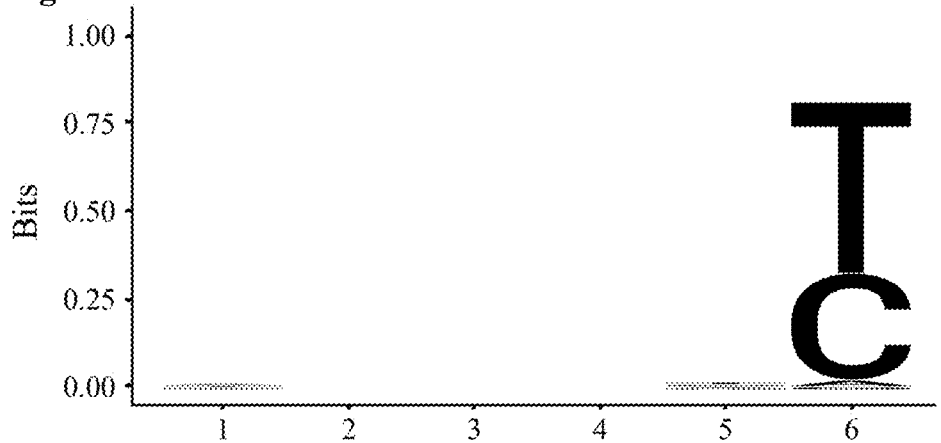
FIG. 16. Sequence logo for UMI region of 3' adaptor template in cDNA libraries. In the adaptor template region NNNNNYC-3' there was no influence of nucleotide sequence on efficiency of template copying at any NNNNNY position, indicated by the lack of a sequence logo for the first 5 positions and reads with both T and C in the sixth position. Similar results were obtained for cDNA libraries made with WT_WT, F753A_WT, and F753A_I770A listed as BoMoC used in TT step_BoMoC used in cDNA synthesis step.

In this Example, neither the primer duplex nor the adaptor template contained degenerate sequence as a unique molecular identifier (UMI) for individual input template cDNAs. For other uses, an adaptor template can contain a UMI, for example NNNNNYC-3' at the adaptor template 3' end. UMI sequences from the cDNA library demonstrate high complexity without bias towards any particular nucleotide in the NNNNNY region (FIG. 16).

Figure 4:
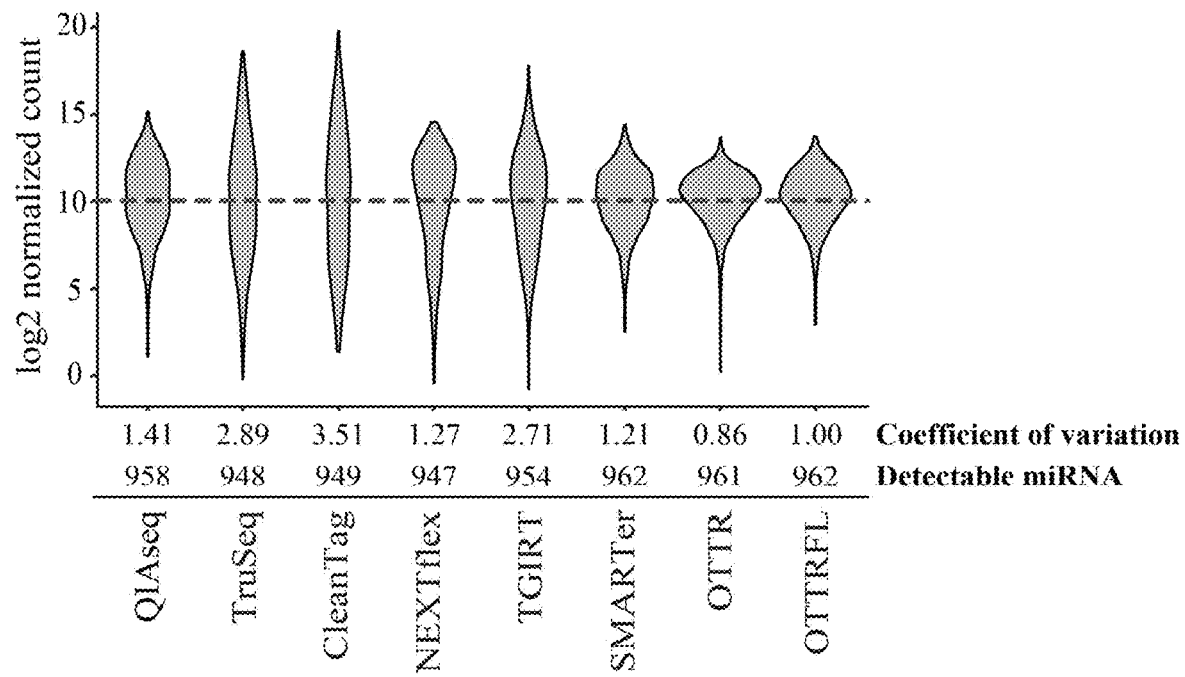
FIG. 4. Benchmarking OTTR against commercially available kits. Other than for OTTR, sequence reads were downloaded from files reported in recent benchmarking using the miRXplore miRNA standard in the published literature (Upton et al PNAS 2021 in press). The same number of miRNA-mapping sequence reads from each library, sampled at random, were used for cross-comparison. Violin plots are the representation of read counts for all miRNA identified in a library. Vertical axis is number of read counts for each identified miRNA, and width of the violin represents number of miRNA with that read count. Wider and shorter violins indicate less bias in miRNA representation in the cDNA library. Below the violins, quantified coefficient of variation (CV) is listed, as well as number of miRNA detected. Commercial kit names are indicated. "OTTRFL" used input 3' end labeling with ddA only and no PCR. "OTTR" used input labeling with ddATP then ddGTP, followed by PCR. Sequencing library preparation methods that include one step of template switching are (a) SMARTer, which uses a modified retroviral RT to append the cDNA 3' adaptor, and (b) TGIRT, which uses a thermostable group II intron RT to append the 5' adaptor.

After sequencing reads are trimmed, mapped to miRNA sequences and counted, several parameters of library production can be quantified. An important parameter of evaluation is the read coverage of each miRNA, which can be displayed by violin plot. In this display of read counts for every miRNA in the pool, more vertical compression and horizontal expansion indicate more miRNAs with similar read counts (i.e. a shorter, fatter violin indicates a better library). OTTR cDNA library preparation occurs with lower bias than leading commercial kits (FIG. 4, OTTR).

To give the violin plot a single number for quantitative cross-comparison, a normal practice is to score the Coefficient of Variation (CV), which is the ratio of read-count standard deviation to mean for each of the 962 input miRNA, averaged. OTTR cDNA library preparation occurs with lower bias (lower variation, lower CV) than leading commercial kits (FIG. 4, OTTR CV=0.86). Sequencing library preparation methods that include one step of template switching are (a) SMARTer, which uses a modified retroviral RT to append the cDNA 3' adaptor, and (b) TGIRT, which uses a thermostable group II intron RT to append the 5' adaptor.

Some evaluations also cross-compare the number of input miRNA detected at a fixed number of sequence reads. OTTR cDNA library preparation can capture all, or all but one, of the input miRNA sequences at a read depth that leaves many miRNA unidentified using commercial kits for cDNA library synthesis (FIG. 4).

Some evaluations determine the degree of template use bias arising from the most 5' three input template nucleotides and the most 3' three template nucleotides. Higher percentage increase in mean squared error (MSE) indicates higher bias arising from different efficiencies of use of template molecules with different nucleotide sequence at each position. Comparison of OTTR and TGIRT cDNA libraries shows that OTTR has less bias based on sequence of input templates (FIGS. 5A-5B).

Example 2

This example describes production of a cDNA library for Illumina HTS using a protocol similar to that of EXAMPLE 1 but without requirement for PCR. This example provides a single-tube library preparation with indexing by reverse transcription. An input RNA pool (e.g. a pool of 962 different microRNAs) is used for OTTR to produce a cDNA library with flanking sequences complementary to the Illumina HTS adaptors P545-R1 (fused at cDNA 3' end) and P7-i7-R2 (fused at cDNA 5'end).

Input RNA pool is first 3'-extended using ddATP with BoMoC under terminal transferase conditions, with no ddGTP. Then phosphatase is added to remove excess ddATP, followed by phosphatase inactivation. Next, the input nucleic acid pool is converted to doubly adaptor-flanked cDNA using BoMoC in cDNA synthesis conditions. For HTS, RNA is removed by treatment with RNase A and an RNase H. Purified cDNA is loaded for cluster generation and sequencing on an Illumina HTS machine (e.g. a miniSeq).

After sequencing reads are trimmed, mapped to miRNA sequences and counted, several parameters of library production can be quantified. One typical parameter of evaluation is the CV Amplification-free OTTR cDNA library preparation occurs with low bias relative to leading commercial kits that depend on PCR (FIG. 4, OTTRFL CV 1.00).

In this Example, P545-R1 complement is fused at cDNA 3' end and P7-i7-R2 complement is fused at the cDNA 5' end. With this architecture, only cDNA with the 3' adaptor sequence included will bind to the flow cell. Swapping the adaptor positions may be useful for other applications.

In this Example, the adaptor template includes the sequence of the i5 index. Part of the adaptor template was base-paired to a complement strand. For other uses, primer complement strands can be entirely RNA or composites of RNA, DNA, and non-standard nucleotides, and they may be partially, fully, or not at all base-paired.

In this Example, only the 3' region of the DNA primer strand is duplex, and the primer strand includes the sequence of the i7 index. With this design, different bar codes can be used in the DNA primer i7 region without requiring different primer-complement strand oligonucleotides. For other uses, different extents of the primer strand can be base-paired in continuous or discontinuous manner.

Example 3

This example describes production of a cDNA library for Illumina HTS with single-tube cDNA library synthesis followed by PCR indexing, comparing simultaneous or staggered 3'-labeling of input RNA with ddATP and ddGTP. An input RNA pool (e.g. a pool of 962 different microRNAs) is used for OTTR to produce a cDNA library with flanking sequences complementary to the Illumina HTS R1 and R2 adaptor regions that bind sequencing primers.

In comparison, an input RNA pool is 3'-extended with ddATP and ddGTP added simultaneously to the reaction, or with ddATP added first to the reaction followed by a subsequent chase of ddGTP. Then phosphatase is added to remove excess ddRTP, followed by phosphatase inactivation. Next, the input nucleic acid pool is converted to doubly adaptor-flanked cDNA using BoMoC under cDNA synthesis conditions. After cDNA purification, 4-8 cycles of PCR are used to extend the cDNA R1 and R2 adaptors to generate full Illumina HTS sequencing adaptors. Product is then used for cluster generation and sequencing on an Illumina HTS machine (e.g. a miniSeq).

After sequencing reads are trimmed, mapped to miRNA sequences and counted, several parameters of library production can be quantified. An important parameter of evaluation is the read coverage of each miRNA, which can be displayed by violin plot and quantified by CV. In this graphic display of read counts for every miRNA in the pool, more vertical compression and horizontal expansion indicate more miRNAs with similar read counts. Surprisingly, adding ddGTP 90 min after the 3' labeling reaction is initiated gives better library based on visual appearance of violin plot and the CV (FIG. 6). This improvement is observed in low-cycle PCR cDNA libraries and also PCR-free libraries prepared largely as in Example 2 (FIG. 6).

Example 4

Protocols such as EXAMPLES 1-3 can be improved by addition of a non-native nucleoside triphosphate to cDNA synthesis reactions. Non-standard nucleotide improves the efficiency of serial template jumping correlated at least in part to suppression of NTA. The improved serial-jump efficiency increases conversion of input RNA to complete cDNA.

For example, cDNA synthesis reactions containing 0.15 mM dDAP-TP and reduced dATP have increased % yield of double-adaptor flanked cDNA product (FIG. 7). The improvement is observed in PCR-free and low-cycle PCR cDNA libraries (FIG. 7).

For HTS, an input RNA pool (e.g. a pool of 962 different miRNA) is used for OTTR with dDAP-TP included or excluded from the cDNA synthesis reaction to produce a cDNA library with flanking sequences complementary to the Illumina HTS R1 and R2 adaptor regions. R1- and R2-flanked cDNA is used for 4-8 cycles of PCR to add the full Illumina HTS sequencing adaptors. Product is then used for cluster generation and sequencing on an Illumina HTS machine (e.g. a miniSeq).

After sequencing reads are trimmed, mapped to miRNA sequences and counted, several parameters of library production can be quantified. An important parameter of evaluation is the read coverage of each miRNA, which can be displayed by violin plot and quantified by CV. Adding dDAP-TP to the cDNA synthesis reaction reduced bias, resulting in improved violin plot appearance and cDNA library sequencing CV (FIG. 7).

Despite being a non-standard nucleotide, dDAP-TP improved both library yield and library CV when added to the cDNA synthesis reaction at a concentration balanced with reduced dATP.

Example 5

The protocol of EXAMPLES 1-4 can be improved by modification of adaptor oligonucleotide ends to block unwanted, spurious cDNAs that contaminate the desired cDNA library.

Although several oligonucleotide 5' end-modifications decrease the ability of BoMoC to continue cDNA synthesis by using a non-contiguous template, very few strongly block this ability. An example of a rare, strongly blocking 5' end modification is Cy5 fluorophore. Libraries with 5' adaptor primer and 3' adaptor template that are appended at their 5' ends with Cy5 have lower levels of unwanted cDNA library products (FIG. 8).

In addition, modification of the 3' region of the primer-complementary strand with 2'OMethyl ribonucleotides reduces unwanted cDNA library products (FIG. 8).

Example 6

The protocol of EXAMPLES 1-5, and other applications of RT, can be improved by chemical additives that affect BoMoC biochemical properties, including but not limited to increased enzyme stability and activity.

BoMoC was stored at −20° C. in various buffers containing 50% glycerol for 6 months, then used for OTTR as described in EXAMPLE 1. The CV of cDNA libraries increased over time in the original storage buffer (i.e. library quality decreased).

Library CV showed much less deterioration if storage buffer contained 400 mM $(NH_4)_2SO_4$ and 200 mM KCl instead of 800 mM KCl (FIG. 9A). This changes both the ion composition and the ionic strength, because a solution with a given concentration of $(NH_4)_2SO_4$, say 400 mM, has an ionic strength contribution from $(NH_4)_2SO_4$ that is three times the ionic strength of 400 mM KCl. Enzymes that bind nucleotides or act on nucleic acid substrates are often inhibited rather than activated by $(NH_4)_2SO_4$ (The ammonium sulfate inhibition of human angiogenin. Chatzileontiadou et al. FEBS Lett. 2016 September; 590(17):3005-18).

Library CV showed less deterioration if storage buffer pH was reduced to pH 6 (FIG. 9B).

Library CV showed less deterioration if 500 mM arginine was included in storage buffer (FIG. 9C). Other concentrations of arginine or use of poly-arginine was not similarly beneficial.

Example 7

Figure 10:
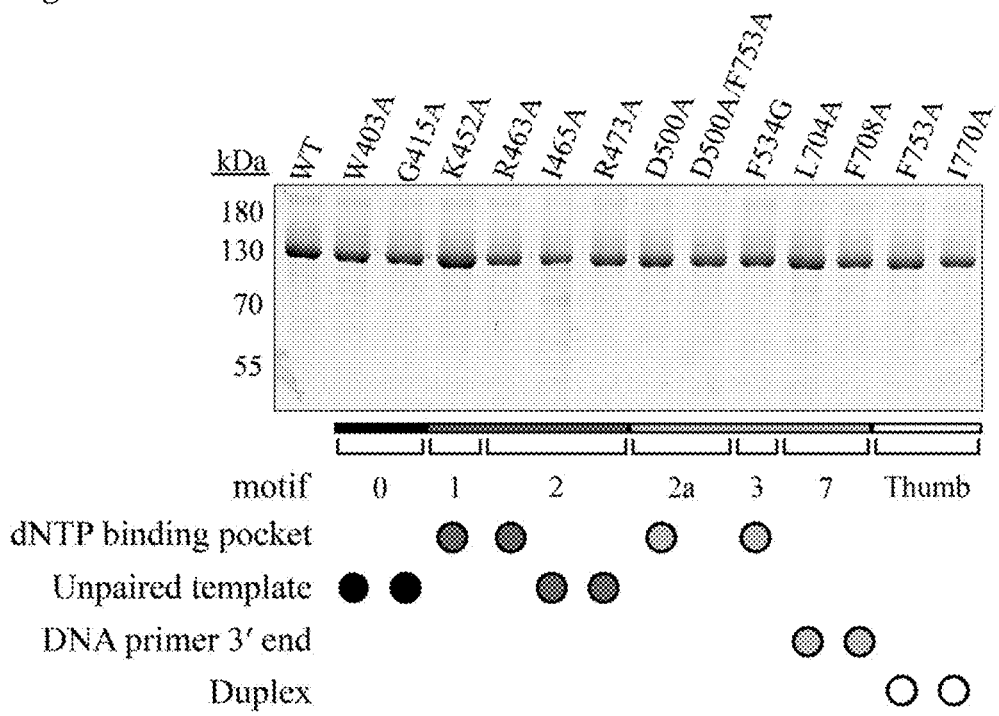
FIG. 10. BoMoC amino acid substitutions were designed and constructed, and variant BoMoC proteins were bacte- FIGS. 11A-11B. Improved TT activity from BoMoC amino acid substitutions. 11A shows a schematic of the assay used for TT activity. 11B shows a denaturing PAGE and direct staining of products from a TT reaction in manganese extending a single-stranded RNA oligonucleotide of ~22 nt. Original BoMoC (WT) or BoMoC with the single amino acid substitution listed at top was assayed in parallel at the same protein concentration.

The protocol of EXAMPLES 1-6, and other applications of RT, can be improved by polymerase sequence changes identified by screening proteins from mutant expression constructs, with mutations informed by sequence alignments and structure prediction for BoMoC (FIG. 10).

One possible type of improvement is an increase in the efficiency of input nucleic acid 3'-labeling by TT activity under OTTR first-step reaction conditions. For example, TT activity is increased by the substitution W403A, G415A, F753A, F753G, or I770A (FIGS. 11A-11B).

BoMoC sequence variants were substituted for original (WT) BoMoC in the TT step of OTTR performed as described in EXAMPLE 1.

Figure 14A:
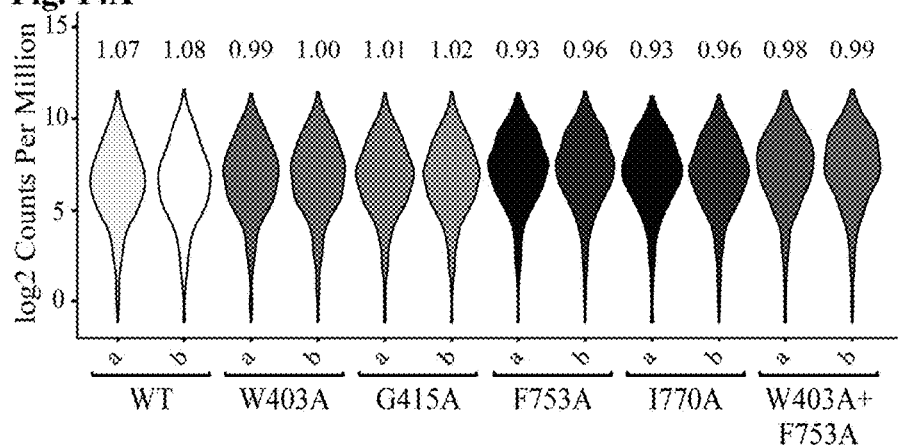
FIGS. 14A-14B. Use of BoMoC mutants for the TT labeling step of OTTR improves cDNA library quality. 14A shows use of the BoMoC variants indicated, with single or double amino acid substitutions, in the first step of OTTR. BoMoC WT was used in the subsequent cDNA synthesis step. miRXplore mix of 962 miRNA was the input RNA pool. Experimental replicates of cDNA library production and sequencing were done ("a" and "b"). Violin plots of read counts for each miRNA are shown with CV indicated over the violin and by grayscale fill (darkest=best). OTTR step 1 use of BoMoC F753A or I770A gave the highest quality cDNA library. 14B shows a boxplots of the percentage of miRNA reads with exact or overcapture 3' ends. Read alignments to each of the 962 miRXplore miRNAs were classified for whether they contained full miRNA sequence (exact) or were one nucleotide short due to pairing of the miRNA 3' end with primer +1Y, which can occur if the miRNA 3' end did not get labeled with ddR in the first step of OTTR (overcapture). The interquartile range (from the 25th to the 75th percentile) of the exact and overcapture 3' ends was plotted as a box. The median is indicated by the horizontal line in the middle of the box. OTTR step 1 use of BoMoC F753A or double-substitution W403A+F753A gave the highest % of exact miRNA 3' ends.
Figure 15A:
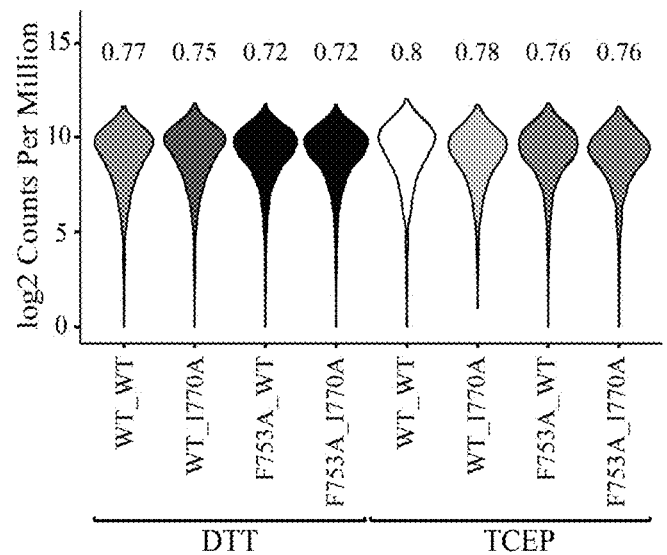
FIGS. 15A-15B. Use of BoMoC mutants for the TT labeling and cDNA synthesis steps of OTTR improves cDNA library quality. 15A shows violin plots and CV of miRNA read counts from OTTR reactions with WT or variant BoMoC used at the TT and/or cDNA synthesis step. The enzyme used for TT step is labeled first, e.g. F753A_I770A is BoMoC F753A for TT step and BoMoC I770A for the cDNA synthesis step. miRXplore mix of 962 miRNA was the input RNA pool. OTTR step 1 TT labeling by BoMoC F753A followed by cDNA synthesis with BoMoC I770A or WT gave the highest quality cDNA libraries. 15B shows boxplots of the percentage of miRNA reads with exact or overcapture 3' ends. The interquartile range (from the 25th to the 75th percentile) of the exact and overcapture 3' ends was plotted as a box. The median is indicated by the horizontal line in the middle of the box. Experimental replicates are indicated as "a" and "b" after the amino acid changed in the BoMoC variant. OTTR step 1 TT labeling by BoMoC F753A followed by cDNA synthesis with BoMoC I770A or WT gave the highest fraction of exact miRNA 3' ends.

Use of BoMoC F753A or I770A for input RNA 3' end labeling improves cDNA library quality assessed by CV (FIGS. 14A and 15A).

Figure 14B:
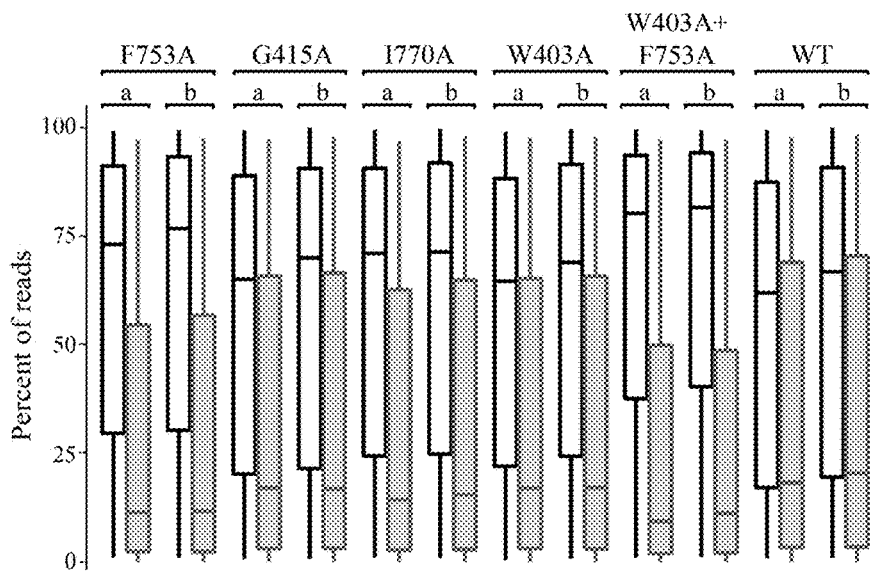

In addition, cDNA library quality improved as assessed by determining the percentage of sequence reads with ddR-labeled miRNA 3' ends. Read alignments to each of the miRXplore miRNA were classified for whether they contained full miRNA sequence with ddR-labeled end paired to the primer +1Y overhang (termed exact) or were one nucleotide offset due to pairing of the unlabeled miRNA 3' end with primer +1Y (termed overcapture), which can occur if the miRNA 3' end did not get labeled with ddR in the first step of OTTR. Use of BoMoC F753A or double-substitution W403A+F753A for the TT first step of OTTR gave the highest percentage of exact miRNA 3' ends (FIG. 14B).

Example 7

The protocol of EXAMPLES 1-7, and other applications of RT, can be improved by polymerase sequence changes that increase reverse transcriptase activity. Hyperactive enzymes were isolated by assaying cDNA synthesis on primed templates (fill-in synthesis). Sequence changes that increased cDNA synthesis activity include the substitution W403A G415A, D500A, L704A, F708A, F753A, I770A, or D500A+F753A (FIGS. 12A-12C).

BoMoC sequence variants were substituted for original (WT) BoMoC in the cDNA synthesis step of OTTR performed as described in EXAMPLE 1.

Figure 15B:
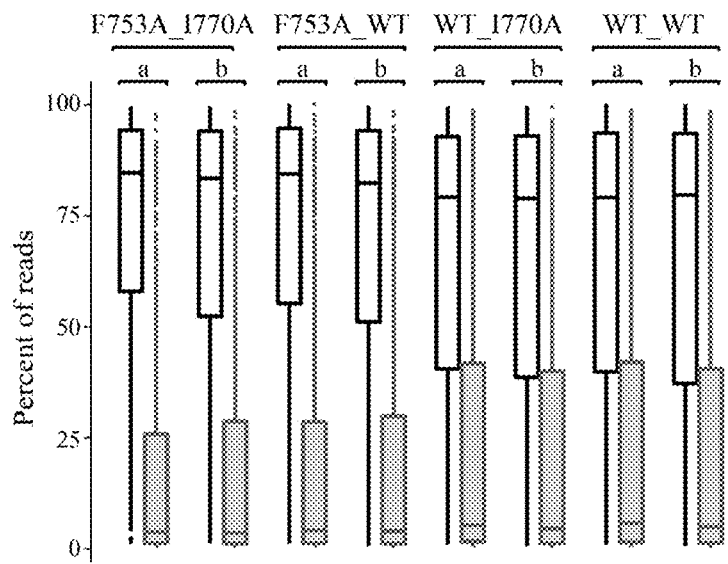

Use of BoMoC I770A for the cDNA synthesis step of OTTR matches BoMoC WT in cDNA library quality assessed by CV (FIGS. 14A and 15A) and BoMoC I770A gives the highest percentage of exact miRNA 3' ends (FIG. 15B).

Example 8

This Example describes the profiling of extracellular vesicle (EV) RNAs by single-tube OTTR cDNA library synthesis, low-cycle PCR, and Illumina HTS. In this example, the input RNA pool was all of the RNA contained in EV secreted by the human cancer cell line HEK293T. Similar results were obtained using all of the RNA contained in EV secreted by the human cancer cell line MDA-MB-231.

Figure 17:
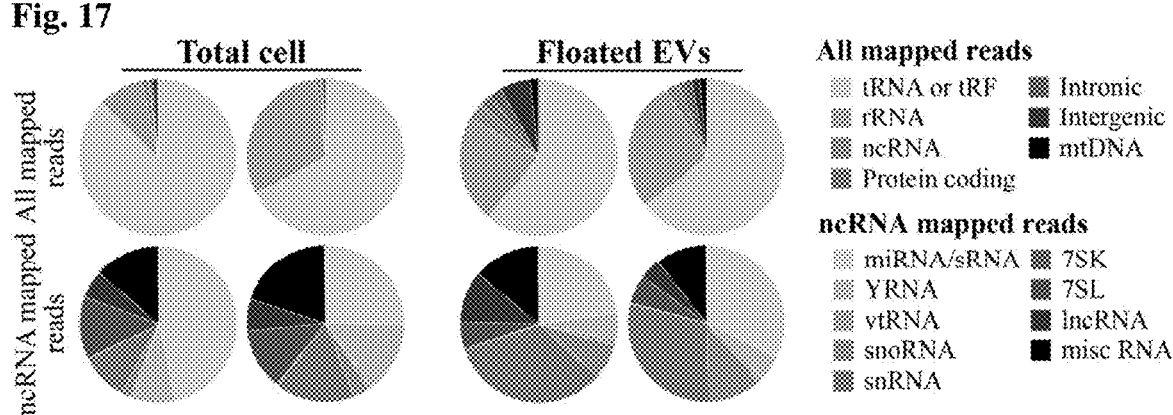
FIG. 17. Pie charts for composition of RNA in cDNA libraries from total-cell small RNA or extracellular vesicle (EV) RNA of HEK 293T cells. Two independently prepared samples of each were used for OTTR cDNA library synthesis. Biotypes of RNA indicated in the key are given wedges according to fraction representation in clockwise order beginning at the clock position of noon for tRNA or tRF. Biotype order is down the first column of the key then down the second column. The ncRNA wedge of the top pie chart was additionally analyzed for its composition, as show in the lower pie charts. Again, biotypes of RNA indicated in the key are given wedges according to fraction representation in clockwise order beginning at the clock position of noon, beginning with RNAs annotated in miRBase (miRNA/sRNA). Biotype order is down the first column of the key then down the second column. Additional abbreviations: tRNA, transfer RNA; tRF, transfer RNA fragment; rRNA, ribosomal RNA; ncRNA, structured non-coding RNA; mtDNA, mitochondrial DNA; vtRNA, vault RNA; snoRNA, small nucleolar RNA; snRNA, small nuclear RNA; lncRNA, long non-coding RNA; miscRNA, miscellaneous uncategorized RNA.

OTTR cDNA libraries were prepared largely according to the method of EXAMPLE 1. After sequencing reads are trimmed and mapped to reference RNA sequences and the human genome, several parameters of library production can be quantified. An important parameter of evaluation is read coverage for the miRNA fraction of EV RNA. EV miRNAs are clinically useful to inventory for cancer diagnostics, as well as other applications, but technical hurdles limit current sequencing utility (Implications and pitfalls for cancer diagnostics exploiting extracellular vesicles. Špilak A, Brachner A, Kegler U, Neuhaus W, Noehammer C. Adv Drug Deliv Rev. 2021 August; 175: 113819). OTTR cDNA libraries inventoried miRNA, as well as many other classes of RNA, at high depth (FIG. 17). Dramatically fewer sequencing reads were required for EV miRNA inventory by OTTR compared to a previous inventory of similar samples performed using other cDNA library synthesis methods (Distinct mechanisms of microRNA sorting into cancer cell-derived extracellular vesicle subtypes. Temoche-Diaz et al. Elife. 2019 Aug. 22; 8:e47544. doi: 10.7554/eLife.47544).

Example 9

This Example describes the profiling of transfer RNAs (tRNA) and their fragments (tRFs) by single-tube cDNA library synthesis, PCR, and Illumina HTS. In this example, an input RNA pool containing tRNAs and tRFs (e.g. the RNA contained in human cell line EV) is used for OTTR to produce a cDNA library with flanking sequences complementary to the Illumina R1 and R2 adaptor regions. OTTR cDNA libraries were prepared according to the method of EXAMPLE 1.

Figure 18:
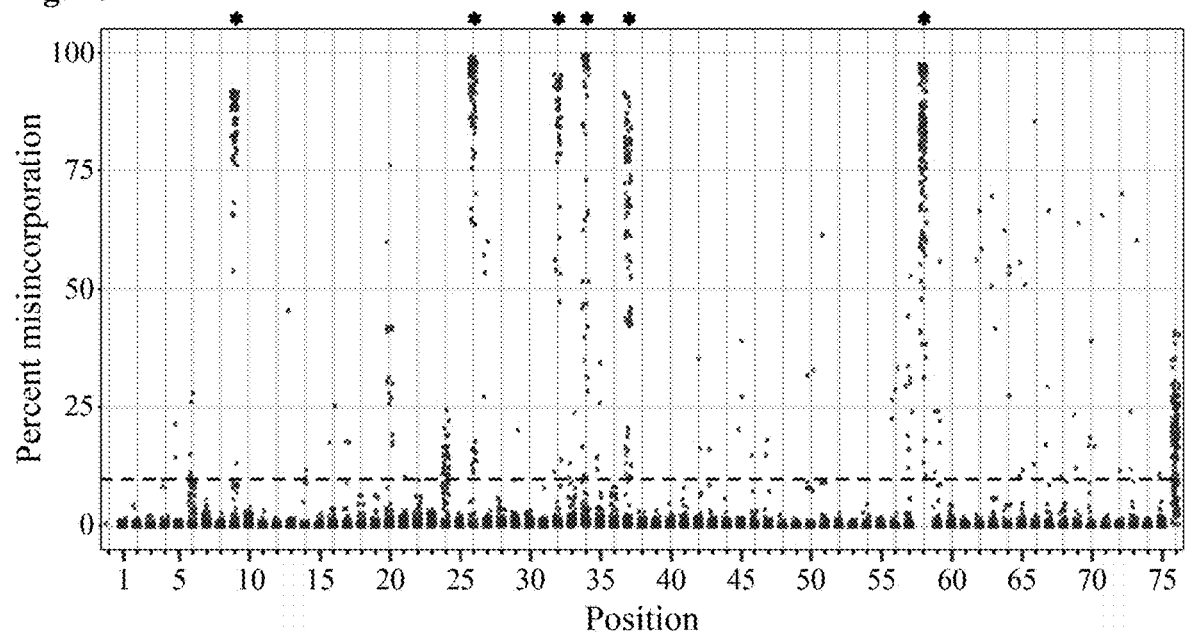
FIG. 18. Plot of percentage of sequencing reads mismatched to genomic DNA at each nucleotide of a tRNA. Each set of tRNAs charged with the same amino acid were combined for analysis (20 distinct groups of tRNAs) and then for each group, a point was plotted to represent each consensus position of a tRNA. Numbered position is on X axis. Each tRNA position has 20 dots arrayed on the vertical scale of increasing fraction mismatch to genomic sequence. Red stars above the plot indicate positions that at a high percentage of reads are post-transcriptionally modified in a manner that could impede RT use of tRNA as template. OTTR cDNA libraries contained full-length tRNAs with genome mismatches indicative of the use of mature tRNA as template.

After sequencing reads are trimmed and mapped to reference RNA sequences and the human genome, several parameters of library production can be quantified. An important parameter is whether full-length tRNA sequences can be obtained in a cDNA library, because many tRNA post-translational modifications are bulky or affect nucleotide base-pairing that terminate reverse transcription. OTTR cDNA libraries contain end-to-end full-length and bona fide fragmented tRNAs with post-transcriptionally modifications detected as genome-mismatching cDNA sequence (FIG. 18). Full-length tRNA sequences were determined even for tRNA templates that blocked group II intron RT copying (Broad role for YBX1 in defining the small noncoding RNA composition of exosomes. Shurtleff et al. Proc Natl Acad Sci USA. 2017 Oct. 24; 114(43):E8987-E8995).

Example 10

This Example describes the profiling of ribosome protected fragments (RPF) of translated mRNAs by single-tube cDNA library synthesis, PCR, and Illumina HTS. In this example, an input RNA pool was generated by nuclease digestion of gently lysed cells, followed by size selection using denaturing PAGE. If the nuclease is RNase 1, RPFs were treated with phosphatase prior to use in OTTR, which was performed largely as described in EXAMPLE 1. If the nuclease is P1, no phosphate treatment was necessary.

Figure 19:
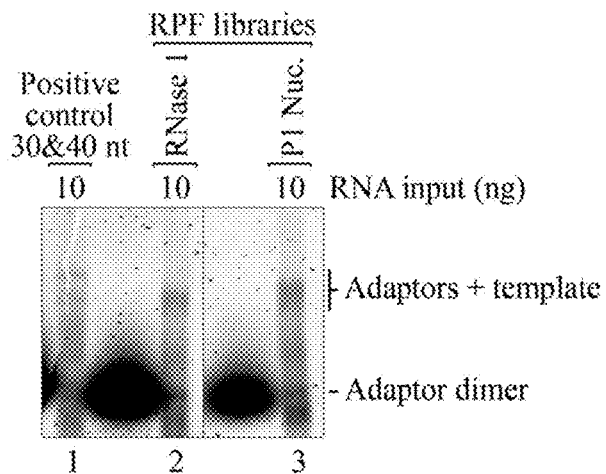
FIG. 19. OTTR for ribosome profiling. OTTR cDNA libraries were produced from ribosome protected footprints of translated messenger RNAs (mRNAs) and analyzed by denaturing PAGE and direct staining. The footprints produced by RNase I digestion are smaller than those produced by P1 nuclease digestion. For both types of footprints, OTTR cDNAs (adaptors+template) were readily produced, indexed by PCR, and sequenced on a miniSeq. The large dark blob migrating near the position of adaptor dimer (5' and 3' adaptor sequences with no mRNA between) is the xylene cyanol loading dye.

OTTR RPF cDNA libraries were analyzed by denaturing PAGE and direct staining (FIG. 19). The mRNA footprints produced by RNase I digestion are smaller than those produced by P1 nuclease digestion, but for both types of RPF, conversion to the doubly-adaptor tagged cDNA library was efficient. OTTR libraries required less than 10% of the RPF input necessary for a comparable amount of cDNA library using the field-standard method of ligating RNA adaptors (Transcriptome-wide measurement of translation by ribosome profiling. McGlincy N J, Ingolia N T. Methods. 2017 Aug. 15; 126:112-129).

After sequencing reads are trimmed and mapped to reference genome, OTTR RPF cDNA libraries have equal or greater complexity of mRNA representation and less sequence bias for the nucleotides at RPF ends than ligation-based methods used in parallel. Similar results are obtained using *S. cerevisiae* or cultured human cells to generate RPFs.

Example 11

This Example describes the profiling of mRNA or genomic DNA (gDNA) by single-tube cDNA library synthesis, PCR, and Illumina HTS. In this example, an input RNA pool (e.g. chemically fragmented mRNA from Saccharomyces cerevisiae cells isolated by oligonucleotide hybridization to the polyadenosine tail) or an input DNA pool (e.g. mechanically fragmented HEK 293T cell gDNA) is used for OTTR to produce a cDNA library with flanking sequences complementary to the Illumina R1 and R2 adaptor regions. The chemically fragmented mRNA was size-selected to isolate the input size range appropriate for Illumina sequencing, and the gDNA was fragmented to an appropriate size range (FIGS. 20A-20C)

OTTR cDNA libraries were prepared largely according to the method of EXAMPLE 1. The size range of template RNA or DNA was biased to smaller size at least in part due to Illumina cluster generation by PCR (FIGS. 20A-20C). Sequencing reads mapped as expected to mRNA or gDNA (FIG. 21). These results demonstrate that OTTR can be used for cDNA library production from fragmented RNA or DNA, including nucleic acids with length >100 nt or bp.

Example 12

This Example describes the profiling of fragmented total RNA from an FFPE sample by single-tube cDNA library synthesis, PCR, and Illumina HTS. In this example, an input RNA pool is used for OTTR to produce a cDNA library with flanking sequences complementary to the Illumina R1 and R2 adaptor regions. OTTR cDNA libraries were prepared largely according to the method of EXAMPLE 1.

Figure 22A:
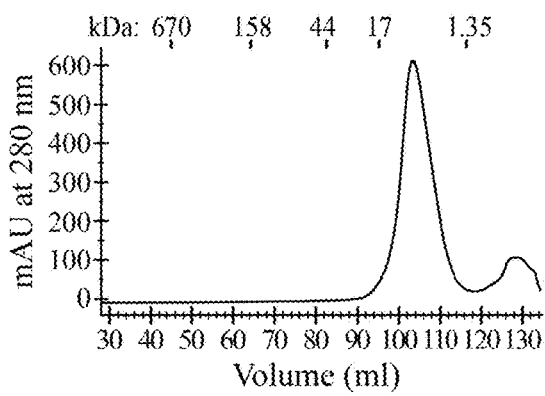
FIGS. 22A-22B. Production and use of a modified version of the single-stranded RNA binding protein TmCspB, TmCspB_SH. 22A shows a chromatogram from the final size exclusion chromatography purification step. 22B shows SDS-PAGE analysis of recombinant TmCspB_SH (described as TmCspB hereafter).
Figure 22B:
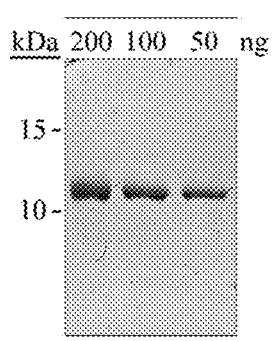

It is advantageous for the goal of this example, and for other protocols, to include a recombinant version of single-stranded (ss) RNA binding protein *Thermotoga maritima* RNA chaperone CspB (TmCspB). TmCspB is stably folded to at least 65-70° C. and shows cooperative binding to RNA, ironing out secondary structure (CspB and CspL, thermostable cold-shock proteins from *Thermotoga maritima*. Phadtare et al. Genes Cells. 2003 October; 8(10):801-10). Fusion of TmCspB to a C-terminal twin-strep and 7-histidine tag generated TmCspB_SH, which was expressed in bacteria and purified (FIGS. 22A-22B).

Figure 23A:
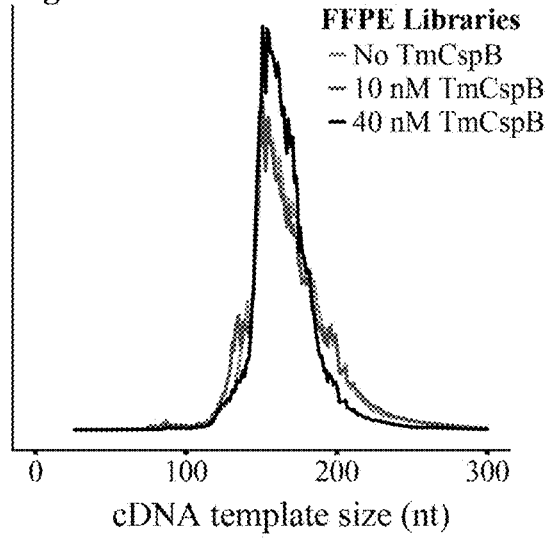
FIGS. 23A-23B. OTTR cDNA libraries from formaldehyde-fixed and paraffin-embedded (FFPE) total RNA. 23A shows length profiles for cDNA sequences corresponding to fragmented FFPE total RNA in OTTR cDNA libraries. Libraries were made without addition of TmCspB or with 10 or 40 nM TmCspB. Y axis is number of reads. 23B shows results from analysis of OTTR FFPE input cDNA libraries by paired-end sequencing. In all libraries, there is a predominance of paired-end read concordance despite the expectation of genome mismatches imposed by RNA chemical damage and post-transcriptional modification. The yield of cDNA library from reactions including TmCspB was four times greater for the same amount of input RNA.
Figure 23B:
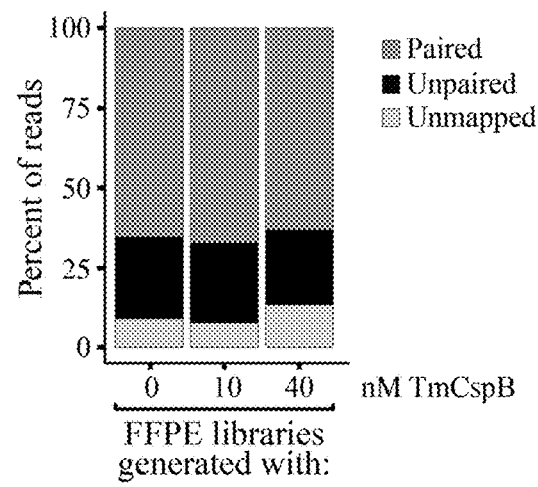

Fragmented FFPE RNA and TmCspB were combined, heated, and then cooled to use as input template for OTTR. Addition of purified recombinant TmCspB improved cDNA library yield 4-fold and sharpened the size profile of the cDNA library (FIG. 23A). After sequencing reads are trimmed and mapped to the human genome, several parameters of library production can be quantified. One important parameter is that sequencing reads can be mapped to the genome or transcriptome, which is true (FIG. 23B). Another important parameter of evaluation is whether the cDNA inserts from OTTR libraries yield diverse insert sequences, which is true (FIG. 23C). These results demonstrate that OTTR can be used for cDNA library production from chemically damaged FFPE total RNA, including fragmented RNA with length >100 nt.

Example 13

For some uses, it is advantageous to enrich the intended cDNA library duplexes from unwanted reaction products. One approach to this goal, for RNA input reactions, would be to enrich cDNA library duplex products based on the length of DNA-RNA duplex. *Xenopus* protein ZFa was isolated for ability to bind double-stranded RNA. It can bind DNA-RNA duplex, which like double-stranded RNA is A-form, but discriminates against DNA-DNA duplex, which tends to B-form (A *Xenopus* zinc finger protein that specifically binds dsRNA and RNA-DNA hybrids. Finerty P J Jr, Bass B L. J Mol Biol. 1997 Aug. 15; 271(2):195-208; Subsets of the zinc finger motifs in dsRBP-ZFa can bind double-stranded RNA. Finerty P J Jr, Bass B L. Biochemistry. 1999 Mar. 30; 38(13):4001-7). Also the protein has a length dependence of binding.

We redesigned OTTR adaptor oligonucleotides to have 6 bp or less length of DNA-RNA duplex, such that adaptor dimer has 12 bp or less of DNA-RNA duplex, while desired cDNA library duplexes generated from RNA input would have >30 bp of total DNA-RNA duplex. With this set-up only cDNA duplexes containing an input RNA template would be expected to bind ZFa.

A purified, bacterially expressed version of *Xenopus* protein ZFa was produced (FIG. 24A). The protein was attached to resin beads and tested for its ability to enrichment DNA-RNA duplexes in a length-dependent manner. The engineered ZFa enriches DNA-RNA duplexes in a length-dependent manner that discriminates adaptor dimer from desired cDNA library product duplexes (FIG. 24B).

Example 14

For some uses, it is advantageous to label input RNAs with a purification tag that remains after cDNA library synthesis, such that duplex cDNA products containing an input template RNA can be enriched from adaptor dimer duplexes.

Figure 25A:
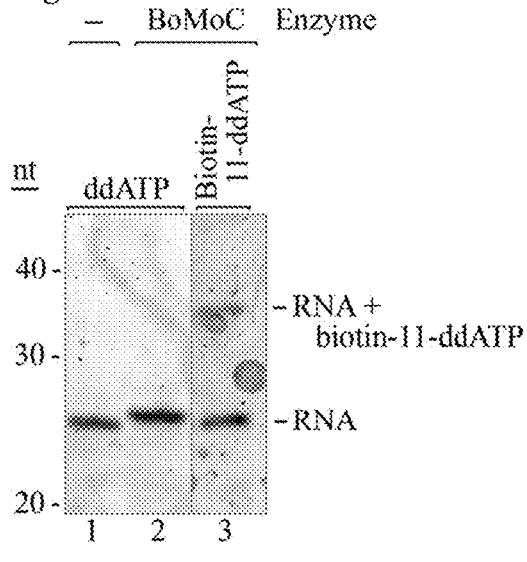
FIGS. 25A-25B. A method for 3' labeling input nucleic acids with biotin as the first step of OTTR cDNA library synthesis. 25A shows a denaturing PAGE gel with direct staining of products of BoMoC TT reactions using an input RNA oligonucleotide and either ddATP or biotin-11-ddATP. 25B shows the analysis of OTTR cDNA libraries made from miRNA standard that was 3'-labeled in the TT reaction step using ddATP (250 micromolar) or biotin-11-ddATP (25 micromolar). The Y-axis plots CPM for only the fraction of sequence reads with the input miRNA labeled in the TT step, not the fraction that had an unlabeled 3' end that could base-pair with the +1Y primer overhang. The interquartile range (from the 25th to the 75th percentile) of CPM for each miRNA was plotted as a box. The median is indicated by the horizontal line in the middle of the box.
Figure 25B:
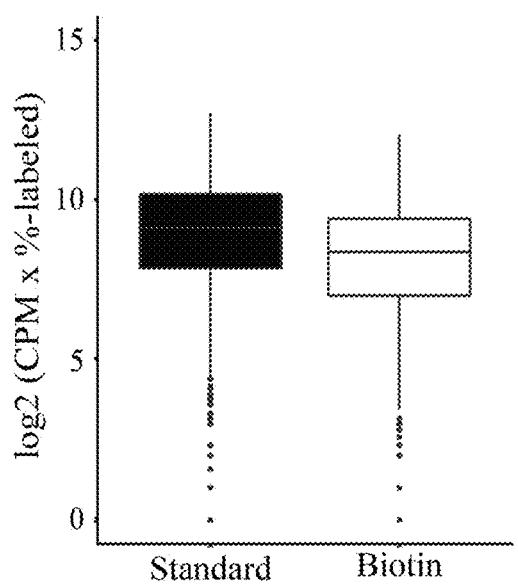

We developed a method for 3' labeling input nucleic acids in the TT step of OTTR with biotinylated ddATP (FIG. 25A). Sequencing of miRXplore cDNA libraries produced by input 3'-labeling with biotin-11-ddATP and WT BoMoC was successful (FIG. 25B).

The invention claimed is:

1. A method of performing 3' extension of a nucleic acid in an ordered two-template relay (OTTR) reaction with a non-retroviral reverse transcriptase (RT), wherein the method further comprises:
   (a) addition of a non-canonical nucleotide to the reaction mixture to suppress excessive non-templated cDNA 3' extension in RT reaction conditions without inhibiting templated DNA synthesis;
   (b) addition of a modified passenger strand of a primer duplex to the reaction mixture;
   (c) labeling of input templates with ddATP then ddGTP by sequential terminal transferase (TT); or
   (d) suppression of unwanted products by termination of template copying by adding to the reaction mixture a Cy5 5' extension of the 3' acceptor template, primer, and/or other oligonucleotides present except those of the input template pool,
   wherein said OTTR reaction exhibits improved reaction yield or suppression of unwanted products in the reaction.

2. The method of claim 1 comprising:
   (a) addition of a non-canonical nucleotide to the reaction mixture to suppress excessive non-templated cDNA 3' extension in RT reaction conditions without inhibiting templated DNA synthesis.

3. The method of claim 1 comprising:
   (b) addition of a modified passenger strand of the primer duplex to the reaction mixture.

4. The method of claim 1 comprising:
   (c) labeling of input templates with ddATP then ddGTP by sequential terminal transferase (TT).

5. The method of claim 1 comprising:
   (d) suppression of unwanted products by termination of template copying by adding to the reaction mixture a Cy5 5' extension of the 3' acceptor template, primer, and/or other oligonucleotides present except those of the input template pool.

6. The method of claim 1 comprising:
   (a) addition of a non-canonical nucleotide to the reaction mixture to suppress excessive non-templated cDNA 3' extension in RT reaction conditions without inhibiting templated DNA synthesis,
   (b) addition of a modified passenger strand of the primer duplex to the reaction mixture.

7. The method of claim 1 comprising:
   (a) addition of a non-canonical nucleotide to the reaction mixture to suppress excessive non-templated cDNA 3' extension in RT reaction conditions without inhibiting templated DNA synthesis,
   (c) labeling of input templates with ddATP then ddGTP by sequential terminal transferase (TT).

8. The method of claim 1 comprising:
   (a) addition of a non-canonical nucleotide to the reaction mixture to suppress excessive non-templated cDNA 3' extension in RT reaction conditions without inhibiting templated DNA synthesis;
   (d) suppression of unwanted products by termination of template copying by adding to the reaction mixture a Cy5 5' extension of the 3' acceptor template, primer, and/or other oligonucleotides present except those of the input template pool.

9. The method of claim 1 comprising:
(a) addition of a non-canonical nucleotide to the reaction mixture to suppress excessive non-templated cDNA 3' extension in RT reaction conditions without inhibiting templated DNA synthesis,
(b) addition of a modified passenger strand of the primer duplex to the reaction mixture,
(c) labeling of input templates with ddATP then ddGTP by sequential terminal transferase (TT).

10. The method of claim 1 comprising:
(a) addition of a non-canonical nucleotide to the reaction mixture to suppress excessive non-templated cDNA 3' extension in RT reaction conditions without inhibiting templated DNA synthesis,
(b) addition of a modified passenger strand of the primer duplex to the reaction mixture,
(d) suppression of unwanted products by termination of template copying by adding to the reaction mixture a Cy5 5' extension of the 3' acceptor template, primer, and/or other oligonucleotides present except those of the input template pool.

11. The method of claim 1 comprising:
(a) addition of a non-canonical nucleotide to the reaction mixture to suppress excessive non-templated cDNA 3' extension in RT reaction conditions without inhibiting templated DNA synthesis,
(c) labeling of input templates with ddATP then ddGTP by sequential terminal transferase (TT),
(d) suppression of unwanted products by termination of template copying by adding to the reaction mixture a Cy5 5' extension of the 3' acceptor template, primer, and/or other oligonucleotides present except those of the input template pool.

12. The method of claim 1 comprising:
(a) addition of a non-canonical nucleotide to the reaction mixture to suppress excessive non-templated cDNA 3' extension in RT reaction conditions without inhibiting templated DNA synthesis,
(b) addition of a modified passenger strand of the primer duplex to the reaction mixture,
(c) labeling of input templates with ddATP then ddGTP by sequential terminal transferase (TT),
(d) suppression of unwanted products by termination of template copying by adding to the reaction mixture a Cy5 5' extension of the 3' acceptor template, primer, and/or other oligonucleotides present except those of the input template pool.

13. The method of claim 1 comprising:
(a) addition of a non-canonical nucleotide to the reaction mixture to suppress excessive non-templated cDNA 3' extension in RT reaction conditions without inhibiting templated DNA synthesis,
wherein the reverse transcriptase (RT) is a truncated, modified *Bombyx mori* R2 non-LTR retroelement RT (BoMOC mutation).

14. The method of claim 1 comprising:
(a) addition of a non-canonical nucleotide to the reaction mixture to suppress excessive non-templated cDNA 3' extension in RT reaction conditions without inhibiting templated DNA synthesis,
wherein the non-canonical nucleotide is 2,6 diaminopurine 2' deoxyribose triphosphate (dDAP-TP).

15. The method of claim 1 comprising:
(b) addition of a modified passenger strand of the primer duplex to the reaction mixture,
wherein the modification comprises 2' OMethyl groups in the 3' end region of the passenger strand of the primer duplex.

16. The method of claim 1 comprising:
(b) addition of a modified passenger strand of the primer duplex to the reaction mixture, wherein the primer duplex comprises a chimeric strand with approximately 10 nt of RNA at the 5' end, and the remainder of nucleotides with 2'OMethyl group substitution.

17. The method of claim 1 comprising:
(c) labeling of input templates with ddATP then ddGTP by sequential terminal transferase (TT), and template 3' extension in a first TT step with a purine (Pu or R) nucleotide or nucleotide analog with a eukaryotic non-long-terminal repeat (non-LTR) retroelement RT (eRT) in manganese reaction buffer, for template selection by primer harboring 3'+1 pyrimidine (Py or Y) nucleotide or nucleotide analog overhang from the primer duplex, wherein to 3'-extend the template pool to near completion using eRT TT activity while retaining maximal library yield relative to unwanted sideproducts, the extension proceeds by initial labeling with an adenosine deoxynucleotide triphosphate derivative followed later in reaction time by supplementation with a guanosine deoxynucleotide triphosphate derivative.

18. The method of claim 1, wherein the reaction mixture further comprises single-stranded (ss) RNA binding protein *Thermotoga maritima* RNA chaperone CspB (TmCspB).

19. The method of claim 1, wherein the reaction mixture further comprises *Xenopus* protein ZFa for RNA-DNA duplex purification from the reaction.

20. The method of claim 1, wherein the reverse transcriptase (RT) is a modified non-retroviral reverse transcriptase comprising a sequence modification relative to the retroelement reverse transcriptase of *Bombyx mori* R2 that is:
(i) a sequence change that increases eRT activity in TT reactions, selected from W403A, F753A, G415A, F753G, and I770A variants;
(ii) a sequence change that decreases TT activity without severe reduction of templated cDNA synthesis, selected from D500A, F534G, L704A and F708A variants;
(iii) a sequence change that increases the parity of representation of input template sequences in cDNA libraries, exemplified by F753A variant;
(iv) a sequence change that reduces ability to add non-templated nucleotides to a cDNA product 3' end, useful for OTTR and other applications in which excessive NTA is detrimental, selected from K452A, R463A, D500A, G501A, F534G, L704A, and F708A variants;
(v) a sequence change that reduces ability to use non-contiguous templates without equivalent reduction of cDNA synthesis activity, useful for applications in which non-contiguous template copying would be detrimental, selected from D500A, G501A, and F534G variants;
(vi) a sequence change that retains primed cDNA synthesis activity (fill-in synthesis) but reduces ability to use non-contiguous templates and to initiate cDNA synthesis by "jumping on" to a template from a primer duplex with blunt or +1Y overhang of the primer strand, useful for applications in which non-contiguous template copying would be detrimental, selected from R463A, R473A, D500A, G501A, F534G, L704A, and F708A variants; or (vii) a sequence change herein that is rescued for "jumping on" to a template from a primer duplex if the primer has a 3' overhang of +2 or +3 nt, useful for increasing the selectivity of cDNA synthesis on input molecules depending on their 3' end sequence, selected from R463A, R473A, D500A, F534G, and L704A variants.

21. The method of claim 1, wherein the reverse transcriptase (RT) is a modified non-retroviral reverse transcriptase comprising a sequence modification relative to the retroelement reverse transcriptase of *Bombyx mori* R2 that is:

a sequence change that increases eRT activity in TT reactions, selected from W403A, G415A, F753A, F753G, and I770A variants.

22. The method of claim 1, wherein the reverse transcriptase (RT) is a modified non-retroviral reverse transcriptase comprising a sequence modification relative to the retroelement reverse transcriptase of *Bombyx mori* R2 that is:

a sequence change that increases eRT activity in TT reactions, selected from a combination of W403A, G415A, F753A, F753G, and I770A variants.

23. The method of claim 1, wherein the reverse transcriptase (RT) is a modified non-retroviral reverse transcriptase comprising a sequence modification relative to the retroelement reverse transcriptase of *Bombyx mori* R2 that is:

a sequence change that increases eRT activity in TT reactions that is I770A variant.

24. The method of claim 1, the method further comprising:

providing a primer duplex comprising a primer strand and a non-extended strand, wherein the 3' end of the primer strand comprises a +1 pyrimidine nucleotide overhang;

providing an DNA template comprising a purine nucleotide at its 3' end; and contacting the primer duplex and the DNA template with a RT in a buffer comprising magnesium ions and one or more dNTPs or analogs thereof, wherein the contacting is carried out under conditions effective for production of a cDNA molecule that is substantially complementary to the DNA template.

\* \* \* \* \*